United States Patent [19]
Yang et al.

[11] Patent Number: 5,819,286
[45] Date of Patent: Oct. 6, 1998

[54] VIDEO DATABASE INDEXING AND QUERY METHOD AND SYSTEM

[75] Inventors: Hsiao-Ying Yang, Taichung Hsiang; Cheng-Yao Ni, Ping Tung; Chih-Hsing Yu, Hsinchu; Chih-Chin Liu, Taipei Hsien; Arbee L. P. Chen, Hsinchu, all of Taiwan

[73] Assignee: Industrial Technology Research Institute, Chutung Hsinchu, Taiwan

[21] Appl. No.: 570,212

[22] Filed: Dec. 11, 1995

[51] Int. Cl.⁶ ..................................................... G06F 17/30
[52] U.S. Cl. ............................................ 707/104; 707/100
[58] Field of Search .................................. 395/601, 611, 395/612, 613, 614, 615, 616, 140, 200.02, 326, 333, 806; 348/1, 5

[56] References Cited

U.S. PATENT DOCUMENTS

| | | | |
|---|---|---|---|
| 5,136,655 | 8/1992 | Bronson | 381/41 |
| 5,164,865 | 11/1992 | Shaw | 360/72.2 |
| 5,488,409 | 1/1996 | Yuen et al. | 348/5 |
| 5,544,305 | 8/1996 | Ohmaye et al. | 395/326 |
| 5,553,281 | 9/1996 | Brown et al. | 395/615 |
| 5,572,641 | 11/1996 | Kuo | 395/140 |
| 5,590,262 | 12/1996 | Isadore-Barreca | 395/806 |
| 5,600,364 | 2/1997 | Hendricks et al. | 348/1 |
| 5,617,539 | 4/1997 | Ludwig et al. | 395/200.02 |

OTHER PUBLICATIONS

E. Oomoto & K. Tanaka, *OVID: Design and Implementation of a Video–Object Database System,* IEEE Trans. On Knowledge & Data Eng'g, vol. 5, No. 4, Aug., 1993, pp. 629–643.

R. Wiess, A. Duda & D. Gifford, *Content–Based Access to Algebraic Video,* Proc. of IEEE Int'l Conf. on Multimedia Computing and Sys., pp. 140–151, May, 1994.

S–K Chang, Q–Y Shi & C–W Yan, *Iconic Indexing by 2–D Strings,* IEEE Trans. on Pattern Analysis and Mach. Intelligence, vol. PAMI–9, No. 3, May, 1987, pp. 413–428.

*Primary Examiner*—Thomas G. Black
*Assistant Examiner*—Ruay Lian Ho
*Attorney, Agent, or Firm*—Proskauer Rose LLP

[57] ABSTRACT

A video indexing and query execution system includes a processor which indexes video clips by: (a) identifying each symbol of one or more graphical icons in each frame of each video clip, (b) determining the horizontal, vertical and temporal coordinates of each symbol of the identified graphical icons, and (c) constructing a database for each identified symbol of the graphical icons. The processor converts a video query from graphical form to string form by: (a) receiving a video query specifying the vertical, horizontal and temporal coordinates of a graphical icon to be matched in at least one frame to be retrieved, and (b) constructing a normal 3-D string from the video query indicating the distance between each symbol of each icon in the video query in each direction. The processor also executes a video query on a video database by: (a) identifying only those video clips of the database whose signatures contain the signature of the executed video query, (b) for each of the identified video clips: (b1) constructing a 1-D list for each of the horizontal, vertical and temporal directions, comprising a plurality of sets of symbols of icons contained in video query, each set containing a permutation of symbols of the icons which satisfy the video query in the respective direction of the 1-D list, and (b2) forming the intersection of the three 1-D lists, and (c) identifying the portions of the video clips, indicated by a corresponding set contained in an intersection set of at least one of the identified video clips, as satisfying the video query.

14 Claims, 15 Drawing Sheets

| VIDEO OID | ICON OID | SYMBOL OID | POSITION |
|---|---|---|---|
| V001 | A | a1 | (2, 3, 1) |
| V001 | B | b1 | (1, 4, 1) |
| V001 | C | c1 | (3, 4, 1) |
| V001 | D | d1 | (5, 1, 2) |
| V001 | D | d2 | (5, 3, 2) |
| V001 | D | d3 | (3, 2, 2) |
| V002 | A | a1 | (225, 340, 3) |
| V002 | A | a2 | (451, 340, 5) |
| V002 | A | a3 | (339, 510, 3) |
| V002 | A | a4 | (560, 582, 7) |
| V002 | B | b1 | (220, 320, 4) |
| V002 | B | b2 | (450, 330, 4) |
| V002 | B | b3 | (450, 420, 6) |
| V002 | C | c1 | (190, 320, 4) |
| V002 | C | c2 | (550, 80, 6) |
| V002 | C | c3 | (330, 250, 4) |
| V002 | C | c4 | (450, 340, 6) |
| V002 | C | c5 | (1000, 420, 1) |
| V002 | C | c6 | (682, 580, 2) |
| V002 | D | d1 | (453, 160, 5) |
| V002 | D | d2 | (561, 80, 1) |
| V002 | D | d3 | (680, 220, 4) |
| V002 | D | d4 | (790, 250, 3) |
| V002 | D | d5 | (450, 160, 6) |
| V002 | E | e1 | (448, 20, 4) |
| V002 | E | e2 | (680, 160, 2) |
| V002 | E | e3 | (432, 160, 2) |
| V002 | E | e4 | (1020, 160, 6) |

FIG. 11

VIDEO DATABASE INDEXING AND QUERY METHOD AND SYSTEM

FIELD OF THE INVENTION

The present invention relates to databases. In particular, the present invention relates to providing a graphical content oriented method of indexing particular video frame sequences and an efficient method for executing queries to identify such particular video frame sequences.

BACKGROUND OF THE INVENTION

A database is a collection of data stored according to some data model. For sake of convenience, the relational database model is used to illustrate the invention. A video database is a collection of frames. One type of video database contains one or more moving picture or frame sequences formed from one or more sequences of frames (also called "clips").

Often, it is desirable to search video databases for specific portions of the clips or subsequences of frames. Searching is performed on a database by executing a query. The query specifies the criteria which the data of the database to be identified satisfies.

Raw video typically is not amenable for specifying "abstract" or "high level" criteria for use in formulating queries. For instance, raw video may include plural frames with rectangular arrays of pixels, wherein each pixel may have a value specifying its intensity and color. It is difficult to formulate an "abstract" query in the form of rectangular arrays of pixels and frame number, alone, e.g., for finding the image of a specific person or object. Therefore, several prior art references have studied the issue of "indexing" or associating more abstract attributes with the video. E. Oomoto & K. Tanaka, *OVID: Design and Implementation of a Video-Object Database System*, IEEE TRANS. ON KNOWLEDGE & DATA ENG'G, vol. 5, no. 4, Aug., 1993, p. 629–643, R. Wiess, A. Duda & D. Gifford, *Content-Based Access to Algebraic Video*, PROC. OF IEEE INT'L CONF. ON MULTIMEDIA COMPUTING AND SYS., p. 140–151, May, 1994 and U.S. Pat. No. 5,164,865 discuss systems in which an operator manually indexes each video clip with textual information. These systems are disadvantageous because the indexing is performed manually and not automatically. The indexing is therefore, tedious, error-prone and subject to the interpretation of the operator who performs the indexing. Moreover, the user must know the textual convention for providing the descriptive textual identifiers, e.g., "male person walking" instead of "man walking" used in forming the index.

U.S. Pat. No. 5,136,655 proposes an automatic indexing system for speech/video clips. The audio information is inputted to a speech recognizer which recognizes the spoken words. The video is inputted to a pattern recognition system which is capable of detecting scene changes (cuts from one camera to another) predetermined patterns, or changes in otherwise static or predictable scenes. The word and scene data is recorded as an index to the accompanying audio/video presentation. This system provides an advantage in that the indexing is automatic and utilizes a consistent manner of indexing the information. The disadvantage relates to the limited ways in which a user must specify image oriented queries. That is, the user must specify exact scene matches to the video database being queried.

S-K Chang, Q-Y Shi & C-W Yan, *Iconic Indexing by 2-D Strings*, IEEE TRANS. ON PATTERN ANALYSIS AND MACH. INTELLIGENCE, vol. PAMI-9, no. 3, May, 1987, p. 413–428 proposes a novel indexing system for still images. Each still image is divided in the vertical and horizontal dimensions to form a two dimensional array of rectangular regions. Pattern recognition is utilized to identify specific objects called icons. For instance, the objects may be small lakes, medium sized lakes and large lakes in an aerial photo of land. Each occurrence of each icon in the still image, called a symbol, is identified and its position in the two-dimensional array is determined. Next a 1-D string is constructed for the horizontal direction and a 1-D string is constructed for the vertical direction, wherein a "string" is an ordered sequence of symbols, with relational operators positioned between each pair of symbols. This is illustrated in FIG. 1. In FIG. 1, the still image is dived into a two dimensional array of rectangular regions with a resolution of 5 in the horizontal direction and a resolution of 5 in the vertical direction. The following convention is used. Let A,B,C,D represent different icons, e.g., images of lakes, trees, rivers, etc. Let each $a_i$ for i from 1,2, . . . represent a symbol of the icon A where a "symbol" is a distinct occurrence of an icon. Let each $b_i$ for i from 1,2, . . . represent a symbol of the icon B. Let each $c_i$ for i from 1,2, . . . represent a symbol of the icon C. Let each $d_i$ for i from 1,2, . . . represent a symbol of the icon D. Consider first the 1-D string for the horizontal direction. Assume that the horizontal coordinates of the image begin at (coordinate 1 at) the left side and increase in the right hand direction. In such a case, we see that the symbol $a_1$ has the smallest horizontal coordinate. The symbols $d_1$ and $b_2$ have the same horizontal coordinate which is one more than the horizontal coordinate of $a_1$. The symbol $c_1$ has a horizontal coordinate which is two more than the horizontal coordinate of $d_1$ and $b_2$. Finally, the symbols $a_2$ and $b_1$ have the same horizontal coordinate which is one more than the horizontal coordinate of $c_1$. The horizontal normal 1-D string u is written as:

$$u=(a_1 \triangleleft d_1 = b_2 \triangleleft c_1 \triangleleft a_2 = b_1)$$

In the horizontal normal 1-D string, each symbol is separated by an operator $\triangleleft$ or an operator "=". The operator "$\triangleleft$" indicates that the symbol, e.g., $a_1$, to the right of $\triangleleft$ precedes the symbol, e.g., $d_1$, to the left of $\triangleleft$ by an unspecified distance of 1 or more. The operator "=" indicates that the symbol to the right, e.g., $d_1$, is the same distance as the symbol to the left, e.g., $b_2$.

Now consider the vertical case. Suppose the smallest vertical coordinate (coordinate 1) is at the bottom of the two-dimensional array and increases by one while proceeding upward. The symbol $c_1$ has the lowest vertical coordinate. The symbols $a_1$ and $b_2$ have the same vertical coordinate which is 2 greater than the vertical coordinate of $c_1$. The symbols $d_1$ and $a_2$ and $b_1$ all have the same vertical coordinate which is 2 greater than the vertical coordinate of $a_1$ and $b_2$. The vertical 1-D string v may be written as:

$$v=(c_1 \triangleleft a_1 = b_2 \triangleleft d_1 = a_2 = b_1)$$

The 2-D string is then simply (u,v) or:

$$(a_1 \triangleleft d_1 = b_2 \triangleleft c_1 \triangleleft a_2 = b_1, c_1 \triangleleft a_1 = b_2 \triangleleft d_1 = a_2 = b_1)$$

The Chang reference utilizes the 2-D string index thus constructed to perform pattern matching. First, define the rank of a symbol $s_j$ (denoted $r(s_j)$) in a 1-D string u to be 1+the number of $\triangleleft$'s which precede the symbol $s_j$. Thus, $r(a_1)$ in u is 1, $r(d_1)$ in u=$r(b_2)$ in u=2, $r(c_1)$ in u=3 and $r(a_2)$ in u=4. Likewise, $r(c_1)$ in v is 1, $r(a_1)$ in v=$r(b_2)$ in v=2 and $r(d_1)$ in v=$r(a_2)$ in v=$r(b_1)$ in v=3. Next define the following rule: a string u is a type-i 1-D subsequence of string u' if u is contained in u'. The substring types 0, 1 and 2 are defined as follows:

if x a y is a substring of u, where a is an operator, and where symbol x of u matches symbol x' of u' and symbol y matches symbol y' of u' then:

(type-0) $r(y')-r(x') \geq r(y)-r(x)$ or $r(y)-r(x)=0$ (type-1) $r(y')-r(x') \geq r(y)-r(x) > 0$ or $r(y')-r(x')=r(y)-r(x)=0$ (type-2) $r(y')-r(x')=r(y)-r(x)$     (1)

A 2-D subsequence may then be determined as follows. Let (u,v) be the 2-D string representation of an image f and let (u',v') be a 2-D string representation of an image f'. (u',v') is a type-i 2-D subsequence of (u,v) if u' is a type-i 1-D subsequence of u and v' is a type-i 1-D subsequence of v. If (u',v') is a type-i 2-D subsequence of (u,v) then f' is a type-i subpicture of f.

The string relations described above can be used for executing video queries. Consider now that f is a picture in a database, such as the frame shown in FIG. 1. Suppose a video query is graphically generated as a picture f', such as is depicted in FIG. 2. A 2-D normal string (u',v') is constructed for the video query picture 2 as follows:

$(c_1 \triangleleft b_1, c_1 \triangleleft b_1)$

Next, we determine using relation (1) whether (u',v') is a 2-D substring of (u,v) of f, and if so, what type. According to (1) above, (u',v') is a type-0 and a type-1 substring of (u,v). Thus, f' is a type-0 and a type-1 subpicture of f.

Consider now, the query picture f" of FIG. 3. The normal 2-D substring of picture f" is:

$(a_1 \triangleleft d_1, a_1 \triangleleft d_1)$

Picture f" is a type-0, a type-1 and a type-2 subpicture of picture f.

Note that the "types" specify increasing degrees of matching as i goes from 0 to 2. For instance, all of the symbols of a type-0 subpicture are contained in the reference picture. In a type-1 subpicture, a first symbol a which precedes a second symbol b in the type-1 subpicture will also precede symbol b in the reference picture, for any pair of symbols a and b. However, other symbols not present in the subpicture may also be present in the reference picture which intervene between a and $b_1$, i.e., precede b but not a. For instance, $c_1$ precedes $b_1$ in both the vertical and horizontal directions of f' and f. However, in f, $a_1$ and $b_2$ also precede $b_1$ but not $c_1$ in the vertical direction. In a type-2 subpicture, the relative order of precedence between symbols is strictly maintained. For instance, there are no symbols in between $a_1$ and $d_1$ in either the vertical or horizontal directions in both FIGS. 1 and 3.

The Chang reference provides the specific advantage in that the user need not specify precise scenes in querying the database. Rather, the user may specify relative positions of smaller objects or symbols in desired scenes to be retrieved. However, the Chang reference only applies to spatial matching of still pictures. Also, the particular pattern matching strategy is cumbersome.

It is therefore an object of the present invention to overcome the disadvantages of the prior art.

SUMMARY OF THE INVENTION

This and other objects are achieved by the present invention. According to one embodiment, a system is provided for indexing video clips, converting queries from iconic form to strings and for executing the queries against the database. The system has a processor and a memory. The processor illustratively executes the following steps in indexing a video clip:

(a) identifying each symbol of one or more graphical icons in each frame of each video clip, (b) determining the horizontal, vertical and temporal coordinates of each symbol of the one or more identified graphical icons, and (c) constructing an index base for each identified symbol of the one or more graphical icons which includes its coordinates.

The processor illustratively stores the index base thus constructed in the memory. Note that the memory can also store the database of video clips.

In converting a video query from graphical form to string form, the processor illustratively performs the following steps:

(a) receiving a video query indicating at least one frame of a video clip to be retrieved, the video query specifying the vertical, horizontal and temporal coordinates of at least one graphical icon in at least one frame, and (b) constructing a 3-D string from the video query, which 3-D string indicates the distance between each symbol of each icon in the video query in the vertical, horizontal and temporal directions.

In executing a video query on a database containing at least one sequence of video frames, the processor illustratively performs the following steps:

(a) identifying only those video clips of the database whose signatures contain the signature of the executed video query, (b) for each of the identified video clips:

(b1) constructing a 1-D list for each of the horizontal, vertical and temporal directions, wherein each of the 1-D lists comprises a plurality of sets of symbols of icons, which icons are contained in the signature of the executed video query, and wherein each of the sets contains a permutation of symbols of the icons which satisfy the video query in the respective direction of the 1-D list, (b2) forming the intersection of the three 1-D lists for the horizontal, vertical and temporal directions, and (c) identifying the portions of at least one of the identified video clips, indicated by a corresponding set contained in an intersection set of at least one of the identified video clips, as satisfying the video query.

Illustratively, the processor accesses the index base stored in the memory in order to generate the signature of each video clip and to construct the 1-D lists.

Thus, the invention provides a video indexing and video query strategy that accommodates the temporal nature of moving pictures (sequence of frames). For instance, a video query may be devised to identify a video clip in which a first group of symbols appear in a first frame and a second group of symbols appear in a later frame.

In short, a content oriented video indexing and query method and system are provided. The indexing and query method and system enable identification of portions of clips in a simple and robust fashion.

BRIEF DESCRIPTION OF THE DRAWINGS

FIG. 11 illustrates an index base generated according to an embodiment of the present invention.

DETAILED DESCRIPTION OF THE INVENTION

Figure 1:
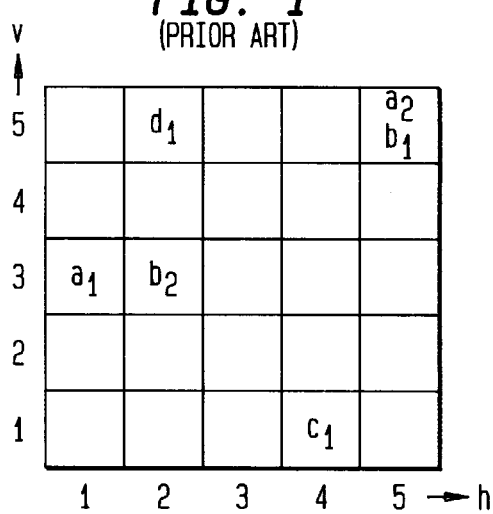
FIG. 1 illustrates 2-D string indexing of a reference still image in a database.
Figure 2:
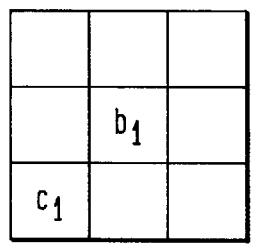
FIGS. 2–3 illustrates queries on the still image database in iconic form.
Figure 3:
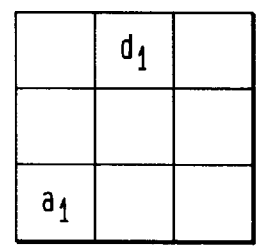
Figure 4:
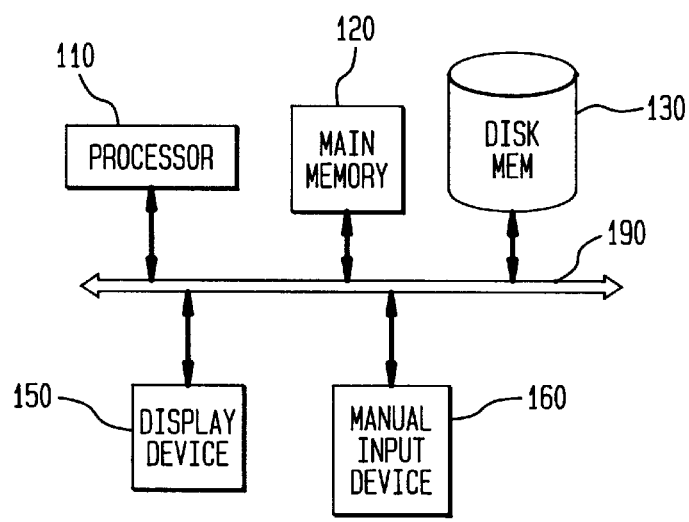
FIG. 4 shows a system according to an embodiment of the present invention.

FIG. 4 shows an apparatus 100 for indexing a video database and executing queries on the indexed video database according to an embodiment of the present invention. As shown, the apparatus 100 has a processor 110, such as an Intel™ Pentium™ microprocessor or a Motorola™ PowerPC 603™ microprocessor. The processor 110 executes suitable software for carrying out the functions described below. The apparatus 100 also has a main memory 120 and a disk memory 130 for storing the video database and queries executed thereon. The processor 110, main memory 120 and disk memory 130 are connected to a bus 190 which transfers data, e.g., program instruction or video information, between the devices connected thereto. A display device 150, such as an liquid crystal display (LCD) or cathode ray tube (CRT) monitor is provided which may be connected to the bus 190 via a graphics adaptor (not shown). Illustratively, the display device 150 is capable of displaying motion picture video thereon, for example, motion picture video of a database stored by the apparatus 100 or frames of a video query. A manual input device 160, such as a keyboard and mouse/pointing device 160 may also be provided which are also connected to the bus 190. the manual input device can receive keypunch/pointing input from a user, for example, to generate queries as described below.

Figure 5:
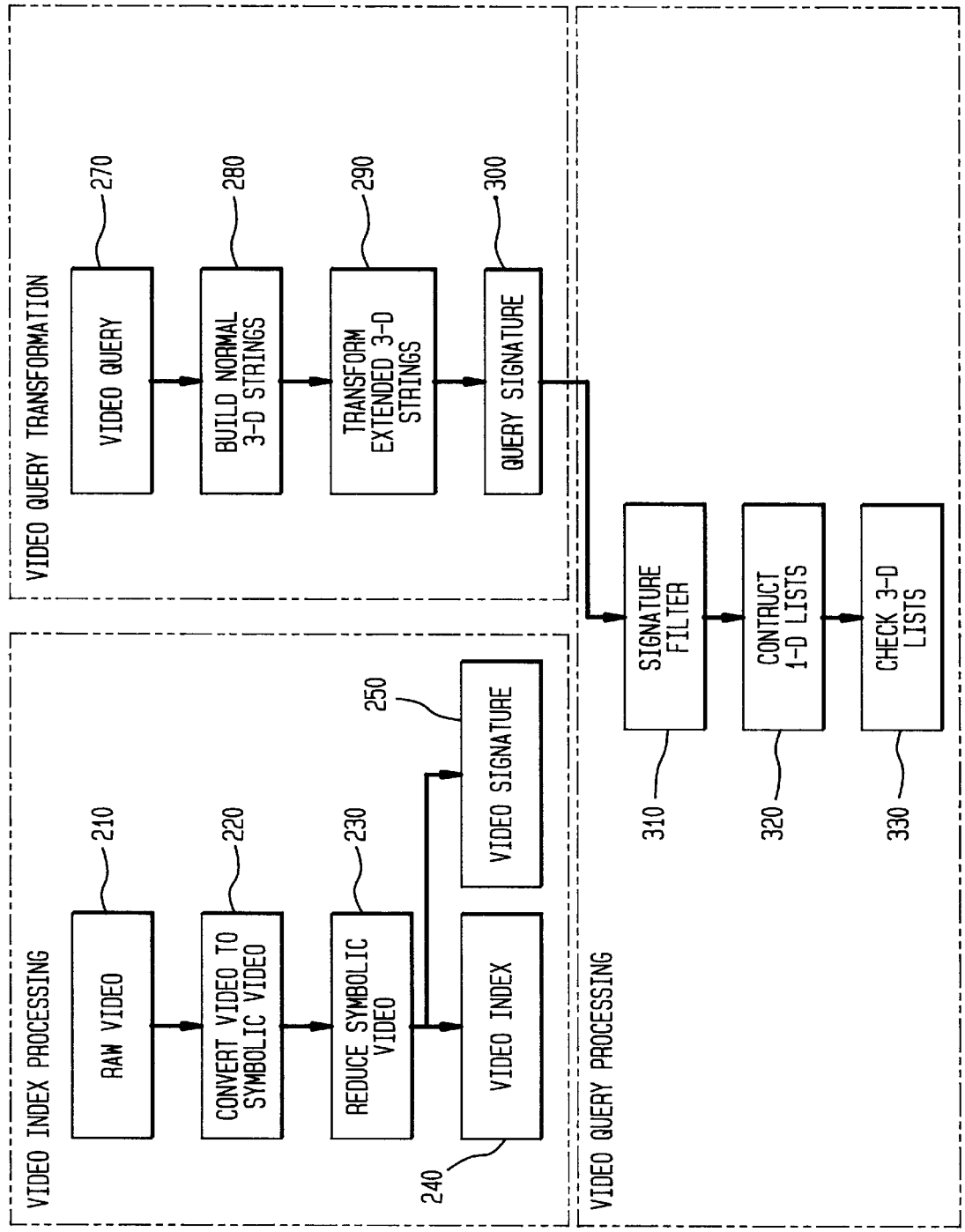
FIG. 5 is a flowchart which schematically illustrates a process according to an embodiment of the present invention.
Figure 6:
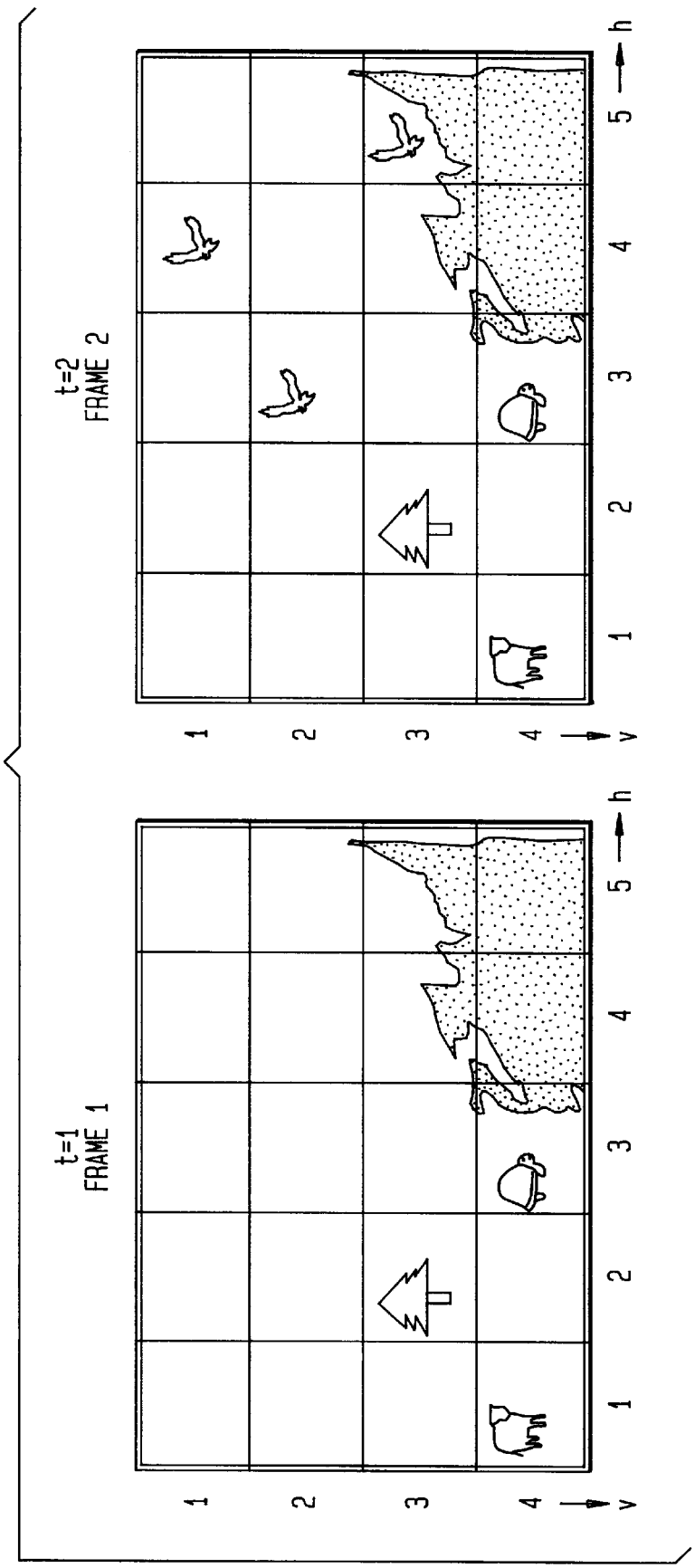
FIG. 6 shows raw video of a database prior to indexing.

FIG. 5 depicts a process executed by the apparatus 100 (under control of the processor 110) in the course of indexing the video database and executing the queries on the database. Steps 210–250 are for indexing a video database and may be performed prior to, i.e., "off-line," from processing and executing queries. In step 210, the apparatus 100 obtains the raw video. For instance, a removable media disk containing the raw video may be inserted into a disk drive of the apparatus 100 and transferred to the main memory 120 or disk memory 130 (assuming the disk memory 130 is a hard disk). Alternatively, the disk memory 130 is the removable media hard disk drive, such as a CD ROM drive or DVD (digital video disk), etc. In another variation, the video information is downloaded to the main memory 120 or disk memory 130 via a network to an interface (e.g., Ethernet interface, ATM interface FDDI interface, modem, etc., not shown) connected to the bus 190. In yet another variation, the video is inputted from a camera in real time via a video capture interface (not shown) connected to the bus 190. In a further variation, the raw video is generated by the processor 110 (for example, using animation, CAD/CAM or other suitable graphics software) and then stored in the main memory 120 or disk memory 130. FIG. 6 depicts two sequential frames of a video clip, labeled "frame 1" and "frame 2", which illustratively is obtained in step 210.

Figure 7:
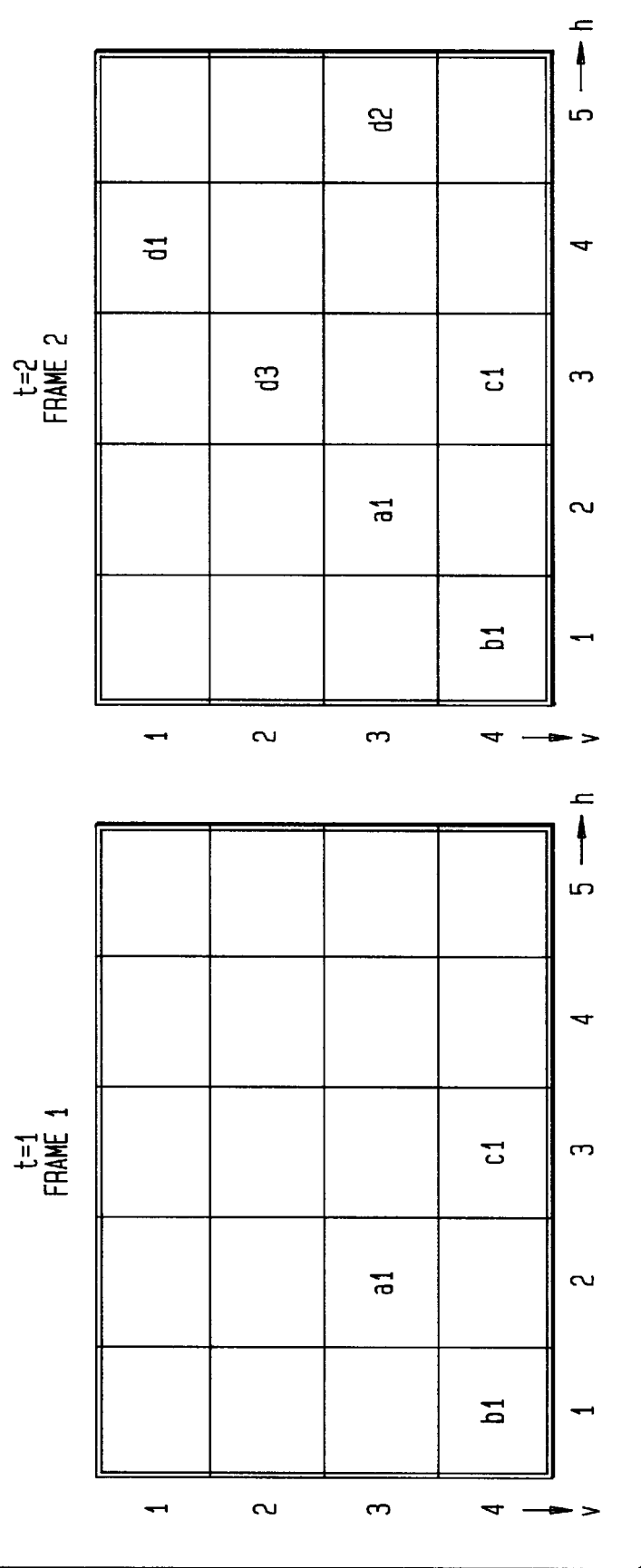
FIGS. 7–8 show the extraction and filtering of symbols from the video of FIG. 6 according to an embodiment of the present invention.

The processor 110 then executes step 220. In step 220, the video is converted to symbolic data. Illustratively, pattern recognition may be performed to identify specific icons in the video. Consider the video shown in FIG. 6. Pattern recognition may be performed to identify the cow icon, tree icon, turtle icon and eagle icons. (Note, it is not strictly necessary to recognize the pattern of the cow icon as a cow; all that is necessary is to identify each similar graphical occurrence or symbol of the cow pattern in each frame of the clip.) Any well known pattern recognition process may be used to recognize the icons. See for example, S-K Chang, Q-Y Shi & C-W Yan, *Iconic Indexing by 2-D Strings*, IEEE TRANS. ON PATTERN ANALYSIS AND MACH. INTELLIGENCE, vol. PAMI-9, no. 3, May, 1987, p. 413–428. Next, each frame of the video clip is divided into a two-dimensional array of rectangular regions. As shown in FIG. 6, frame 1 and frame 2 are divided into four row by five column rectangular arrays. Each symbol or occurrence of an icon is identified. This is illustrated in FIG. 7. Let "A" be the icon designator for the tree icon, "B" be the icon designator for the cow icon, "C" be the icon designator for the turtle icon and "D" be the designator for the eagle icon. (For sake of convenience, the icons are simply referred to by their designators below). The symbols b1, a1 and c1 are present in frame 1. The symbols b1, a1, c1, d1, d2 and d3 are present in the frame 2.

Figure 8:
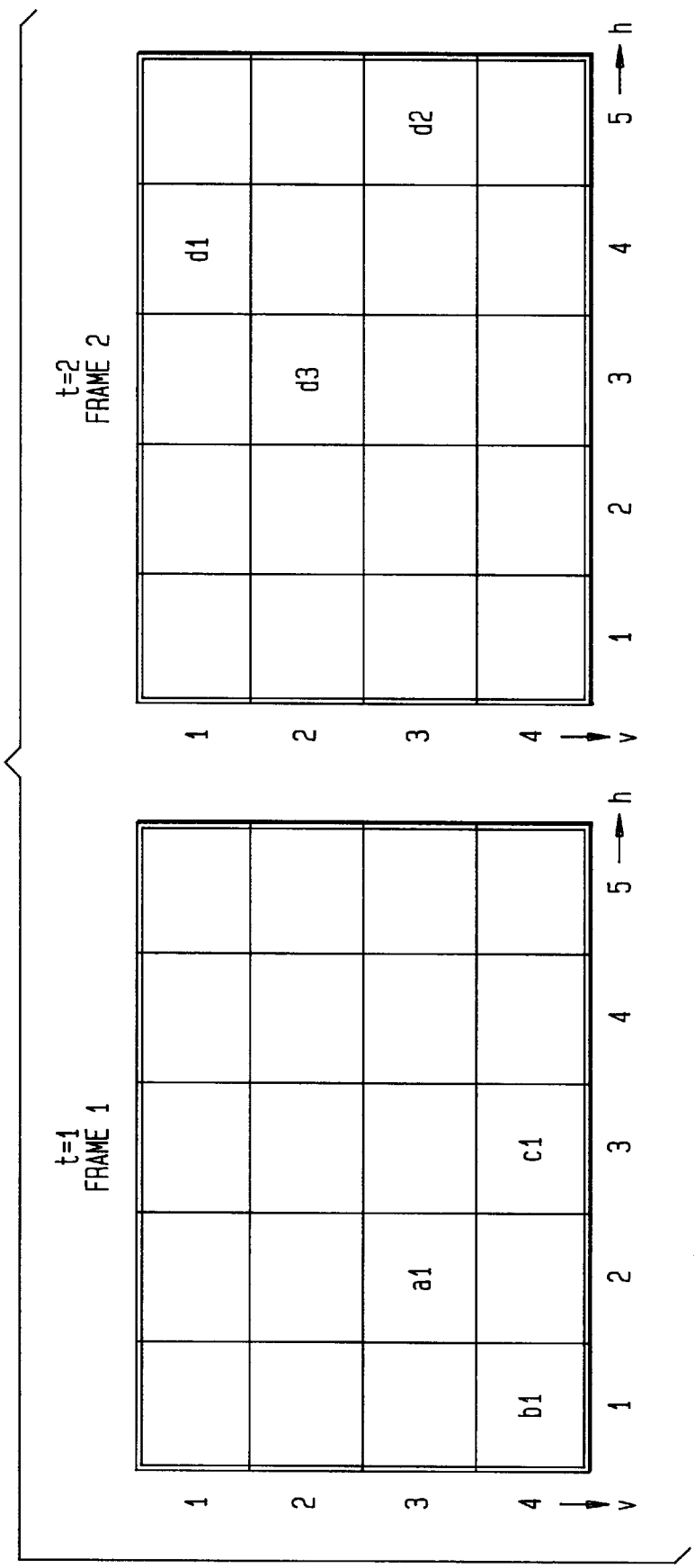

Next, the processor 110 executes steps 230–240. In step 240, the processor 110 records the symbols identified in step 220 including the coordinates of the symbols. However, the processor 110 only records a symbol and its coordinates in the first frame in which the symbol appears. All other identifications of occurrences of the symbol are filtered out or discarded in step 230. This is illustrated in FIG. 8. Note that symbols a1, b1 and c1 are identified in both frame 1 and frame 2 but the identifications of symbols a1, b1, and c1 are disregarded or discarded from frame 2 in step 230. The discarding operation of step 230 produces "reduced symbolic video" or RSV. In step 240, the processor 110 illustratively constructs a video index base such as is shown in Table 1 below.

TABLE 1

| Video OID | Icon OID | Symbol OID | Position |
|---|---|---|---|
| V001 | A | a1 | (2, 3, 1) |
| V001 | B | b1 | (1, 4, 1) |
| V001 | C | c1 | (3, 4, 1) |
| V001 | D | d1 | (5, 1, 2) |
| V001 | D | d2 | (5, 3, 2) |
| V001 | D | d3 | (3, 2, 2) |

Each row of the index base table contains information of a symbol identified in step 220 but not discarded in step 230. In Table 1 "OID" stands for object identifier. The video OID attribute (or column) indicates the identifier of the clip in which the symbol is located. Illustratively, the same symbol may occur in more than one clip and may be entered in the video index base once for each clip (step 230 is performed on a clip-by-clip basis). The icon OID attribute indicates the identifier of the icon of the symbol. Likewise, the symbol OID attribute indicates the identifier of the symbol. Finally, the position attribute indicates the (x,y,t) coordinates in the horizontal (x), vertical (y) and temporal (t) directions. The temporal coordinate t illustratively is simply the frame number, e.g., in order of play, of the frame containing the symbol. As an example, consider the symbol a1 of clip V001. This symbol is contained in frame 1 and frame 2 as shown in FIG. 7. As shown in FIG. 8, the identification of symbol a1 in frame 2 is discarded. The symbol a1 is located in the second column, third row and first frame. Therefore the symbol has (x,y,t) coordinates (2,3,1). Illustratively, the processor 110 stores the video index base thus generated in main memory 120 or disk memory 130.

The processor 110 may perform step 250 contemporaneously with step 240. In step 240, the processor 110 forms the signature of each video clip. The signature is the set of all icons which occur in at least one frame of the clip (i.e., all icons of which at least one symbol is contained in at least one frame of the clip). In the case of the video clip shown in FIG. 6, the signature is the set {A,B,D,C}. Illustratively, the processor 110 stores the video clip signatures in main memory 120 or disk memory 130.

Figure 9:
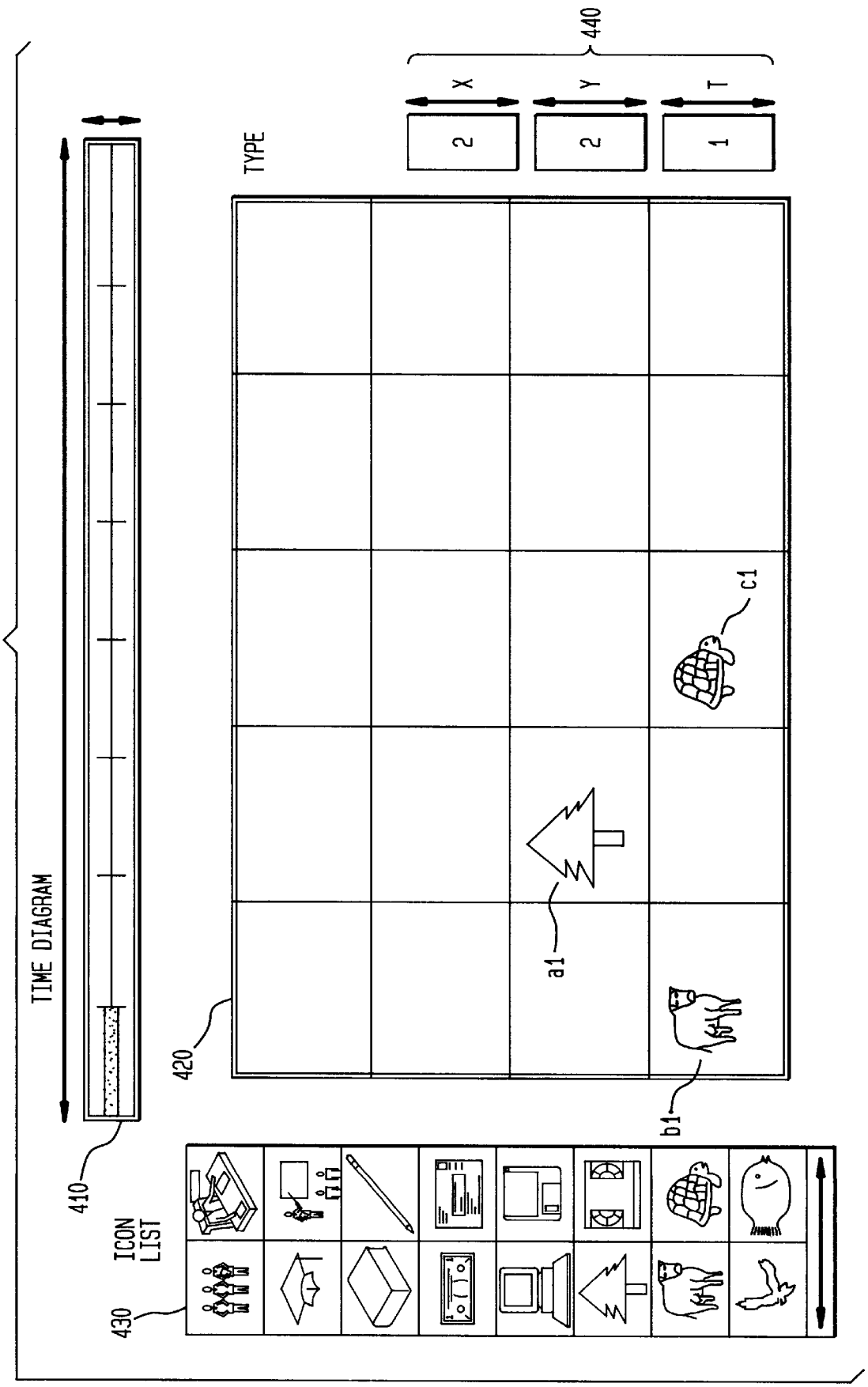
FIGS. 9–10 show graphical user interface screens displayed in the course of formulating a video query according to an embodiment of the present invention.
Figure 10:
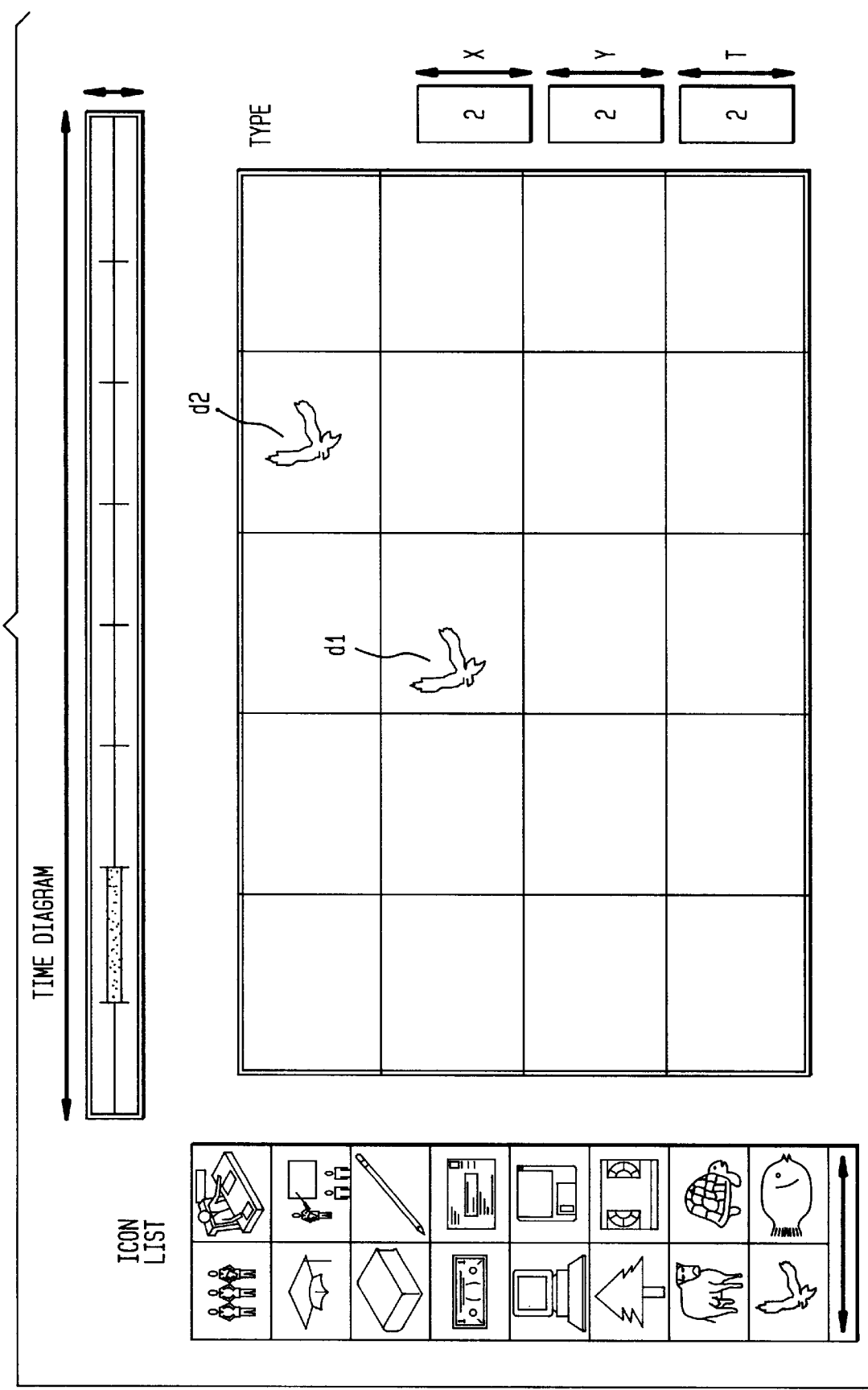

Steps 270–300 are for transforming video queries into suitable strings for query execution. In step 270, the processor 110 receives the video query. Illustratively, the video query is specified in graphical form. The video query may be generated using the manual input device 160 and display device 150. This is illustrated in FIGS. 9 and 10. FIGS. 9 and 10 illustrate part of an image displayed on the display device 150 during query generation. As shown, the image is in the form of a control panel with a time diagram 410, frame window 420, icon list 430 and "query type" indicators 440 (see Table 2 discussed below). The time diagram 410 is a "meter" which graphically indicates the relative position of the frame displayed in the frame window in the sequence of frames that make up a clip. The frame window 420 displays a single query frame which is divided into two-dimensional rectangular regions. Using, for example, a pointer device, the user may select copies of icons in the icon list 430 and position them in particular rectangular regions of the frame window. (Note that each positioned "copy" of an icon is a symbol.) The icon list 430 may be a predefined list of icons which are contained in the video clips of the video database. The user may input the "query type" at particular vertical, horizontal and temporal coordinates using the "query type" indicators 440.

The placement of symbols in the frame window 420 designates criteria of a particular frame of the video query. Naturally, the user can designate criteria for multiple query frames. For instance, FIG. 9 illustrates the placement of symbols in a first frame t=1 of the video query and FIG. 10 illustrates the placement of symbols in a second subsequent frame t=2 of the video query. Thus, the video query designates criteria, namely, symbols at particular vertical and horizontal coordinates, in each of two successive frames with temporal coordinates t=1 and t=2, respectively.

After receiving the video query, the processor 110 executes step 270. In step 270, the processor 110 receives a matching criterion for purposes of determining how to compare the video query symbols to the video database. Four types of matching criterion may be specified, namely, "containment," "precedent," "equal," and "distance between 2 symbols." The "containment" criterion requires that the symbols of the video query merely be contained in the matching video. That is, the relative position of each symbol in video clip does not matter. Typically, if this is the matching criterion, then the time coordinates of the symbols are not utilized in the query execution discussed below. The "precedent" criterion requires that the symbols of the matching video must exhibit the same precedential relationship as in the video query, although the distance between the symbols in the matching video need not be strictly the same as in the video query. The "equal" criterion requires that the symbols specified in the query must also appear in the matching video such that each symbol has an identical coordinate value (for one or more coordinate directions specified in the query) vis-a-vis the matching video. Note that the specified coordinate directions of the symbols in the query may have different coordinate values than the symbols in the matching video. For example, suppose the video query specifies a bird icon at horizontal coordinate x=4, a pig icon at horizontal coordinate x=4 and specifies the equal criterion (for the specified coordinate direction horizontal). The video with a pig icon at horizontal coordinate x=4 and a bird icon at an identical horizontal coordinate x=4 matches the query. However, the video with a pig icon at horizontal coordinate x=3 and a bird at horizontal coordinate x=3 also matches the query since the horizontal coordinates of the pig and bird are identical within the matching video (even though they are different from the horizontal coordinate x=4 in the query). The "distance between 2 symbols" criterion requires that the "rank" between the symbols in the matching video must be precisely the same as in the video query. In other words, the "distance between two symbols" criterion requires that symbols must precede each other in the matching video identically as in the video query—no extraneous intervening symbols may be present in the identified video clip frames between each adjacent pair of symbols specified by the video query.

As discussed in greater detail below, 3-D strings are used to represent the video query. Different types of 3-D strings may be constructed for each video query. The type of 3-D string constructed depends on the matching criterion specified in step 270. This is summarized in Table 2 below:

TABLE 2

| Matching criterion | Type-0 | Type-1 | Type-2 | Type-3 |
| --- | --- | --- | --- | --- |
| Containment | ✓ | ✓ | ✓ | ✓ |
| Precedent | X | ✓ | ✓ | ✓ |
| Equal | X | X | ✓ | ✓ |
| Distance between 2 symbols | X | X | X | ✓ |

Above, "✓" means that a 3-D string of the type of the respective column can be used to perform the kind matching. An "X" indicates that a 3-D string of the type of the respective column is not sufficient to perform the kind of matching. Thus, a type-1 3-D string can be used to perform "containment" or "precedent" matching but not "equal" or "distance between 2 symbols" matching.

Next the processor 110 executes step 280. In step 280, the processor 110 builds a normal 3-D string representation of the video query. A normal 3-D string is a string (X,Y,T) where X is a normal 1-D string in the horizontal direction, Y is a normal 1-D string in the vertical direction and T is a normal 1-D string in the temporal direction. Each 1-D string is a sequence of alternating icons and relational operators "?", "|", "=" and "⋖" indicating the relative order of precedence between adjacent pairs of symbols of the icons in the corresponding video query frames. "?" indicates that the order of precedence is undefined. "⋖" indicates that the symbol to the left precedes the symbol to the right by an unspecified distance. "=" indicates that the symbol to the left and right are at an equal distance. "$|_n$" indicates that the symbol to the left precedes the symbol to the right by a distance of n. Illustratively, only the operators "|" and "=" which indicate a precise distance between symbols, are permitted in the normal 1-D string formed in step 280. Consider the video query depicted in the frame windows 420 of FIGS. 9 and 10. The strings X, Y and T for this video query are:

$X:B|_1A|_1C=D|_1D$ $Y:D|_1D|_1A|_1B=C$ $T:A=B=C|_1D=D$ $(X,Y,T):(B|_1A|_1C=D|_1D,\ D|_1D|_1A|_1B=C,\ A=B=C|_1D=D)$

The processor 110 illustratively stores the normal 3-D string in the main memory 120 or disk memory 130.

Next the processor 110 executes step 290. In step 290, the processor 110 converts the normal 3-D string of the video query to an extended 3-D string of a particular query type, i.e., type-0, type-1, type-2 or type-3. The conversion process accords with the matching criterion specified in step 270. Illustratively, the processor 110 uses table 3 to effect the conversion.

For example, consider the video index base shown in FIG. 11. The signature of clip V001 is {A,B,C,D} and the signature of clip V002 is {A,B,C,D,E}. Suppose the video query has the extended 3-D string (X,Y,T) where:

$X:A=B\triangleleft C\triangleleft D=E$ $Y:E\triangleleft D\triangleleft C\triangleleft B=A$ $T:A\triangleleft B=C=E\triangleleft D$ The signature of the video query is {A,B,C,D,E}. The video query signature is a subset of the signature of clip V002 but not a subset of the clip V001. Therefore, no subsequence of frames of clip V001 can satisfy the video query. However, it is possible that a subsequence of frames of clip V002 satisfies the video query.

Next, the processor 110 executes step 320. In step 320, the processor 110 constructs a 1-D list in the horizontal direction, a 1-D list in the vertical direction and a 1-D list in the temporal direction for each clip in the set of clips that can possibly satisfy the video query. This is achieved as follows. Consider as an example the horizontal (X) direction. The processor 110 utilizes the video index base to construct a sequence of sets of symbols of a video clip. Each set of symbols contains all of the symbols of a video clip of a particular corresponding icon (as indicated in the index

TABLE 3

| Normal string indicator | Type-0 string indicator | Type-1 string indicator | Type-2 string indicator | Type-3 string indicator |
|---|---|---|---|---|
| a $|_n$ b | a ? b | a $\triangleleft$ b | a $\triangleleft$ b | a $|_n$ b |
| a $\equiv$ b | a ? b | a ? b | a $\equiv$ b | a $\equiv$ b |

Continuing with the above example, suppose the equal matching criteria is specified. Thus, a type-2 3-D string must be constructed. The string (X,Y,T) above would therefore be converted to:

$(X',Y',T'):(B\triangleleft A\triangleleft C=D\triangleleft D,\ D\triangleleft D\triangleleft A\triangleleft B=C,\ A=B=C\triangleleft D=D)$ The processor 110 illustratively stores the extended 3-D string in the main memory 120 or disk memory 130.

After performing step 290, the processor 110 performs step 300. In step 300, the processor 110 forms the video query signature which is the set containing the icon of which at least one symbol is present in the video query. In the example above, the video query signature would be {A,B,C,D}. Illustratively, the processor 110 stores the video query signature in the main memory 120 or disk memory 130.

Figure 12:
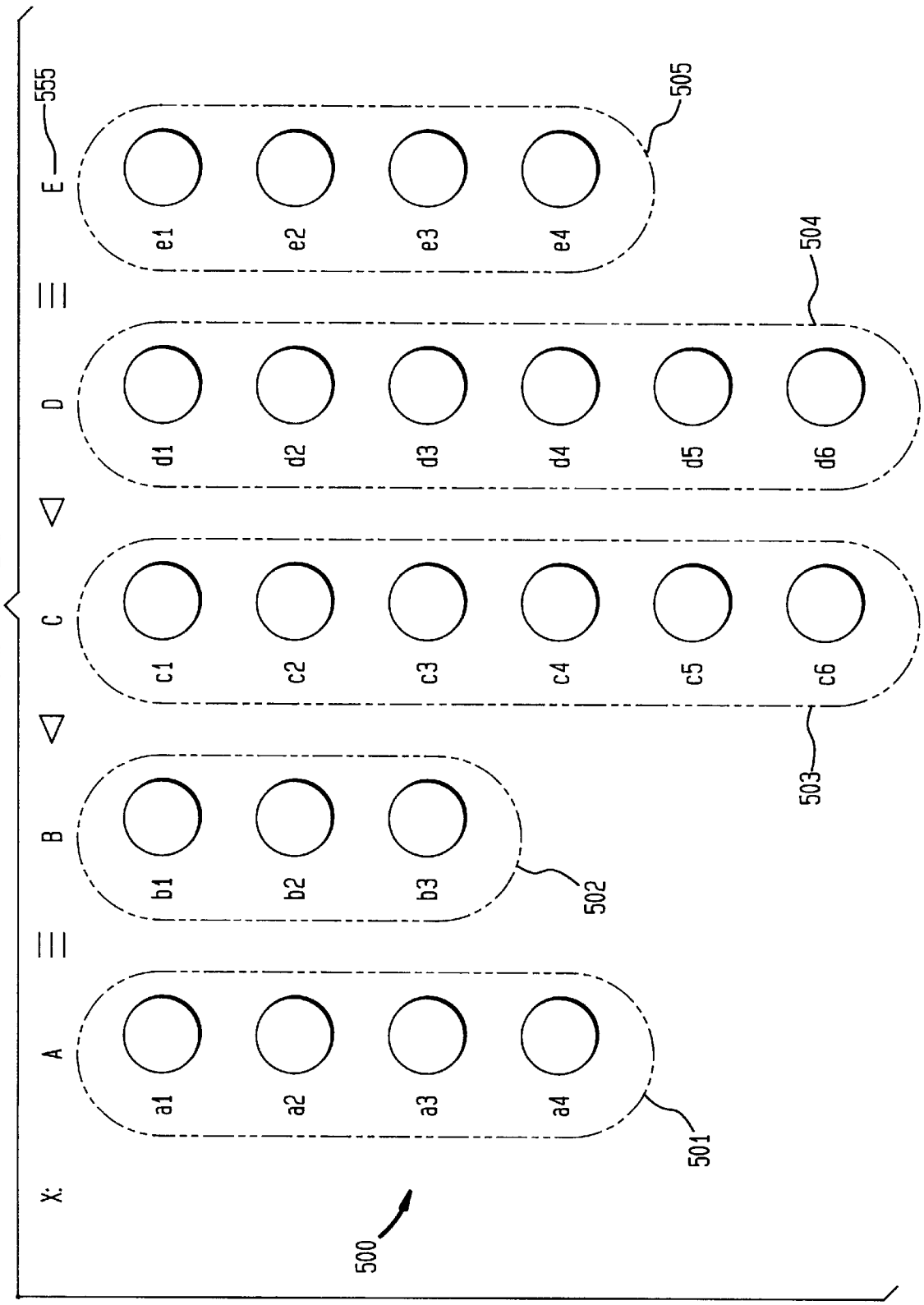
FIGS. 12–16 illustrate the construction of a 1-D list in the horizontal direction for a video clip according to an embodiment of the present invention.

The execution of the video query is performed in steps 310–330. The processor 110 may execute these steps after executing step 300. In step 310, the processor 110 compares the video query signature to the signature of each video clip in the video database. (To do so, the processor 110 illustratively retrieves the video query signature and video clip signatures from the main memory 120 or disk memory 130.) In particular, the processor 110 determines if the video query signature is a subset of the video signature of the clip. If so, then there is a possibility that the video clip can satisfy the video query. If the video query signature is not a subset of the video clip signature, then the video query signature contains at least one icon not also contained in the video clip. Such a video clip cannot possibly satisfy the video query. The processor 110 forms a set containing each clip which the processor 110 determines can possibly satisfy the video query as a result of this comparison.

base). One set of symbols is provided which corresponds to each icon of the 1-D string X (in the horizontal direction) of the video query. This is illustrated in FIG. 12. As shown, for the video clip V002, five sets 501, 502, 503, 504 and 505 of symbols are constructed including, a set 501 of A icon symbols {a1, a2, a3, a4} a set 502 of B icon symbols {b1, b2, b3}, a set 503 of C icon symbols {c1, c2, c3, c4, c5, c6}, a set 504 of D icon symbols {d1, d2, d3, d4, d5, d6} and a set 505 of E icon symbols {e1, e2, e3, e4}. The sets 501–505 are arranged in sequence in the same order as the icons appear in the respective extended 1-D string of the video query 555, i.e., {a1, a2, a3, a4},{b1, b2, b3},{c1, c2, c3, c4, c5, c6},{d1, d2, d3, d4, d5, d6},{e1, e2, e3, e4}.

Next, the processor 110 determines the rank of each symbol in the 1-D list 500 of the video clip as follows. Consider that the resolution in each direction of the video query need not be the same as that used to index the video clips. For example, the query resolution is $R_x=9$ in the horizontal direction, $R_y=9$ in the vertical direction and $R_t=9$ in the temporal direction (where $R_t$ is the number of frames of the video query). On the other hand, the resolution used to index the video clip may be $x_{max}=1024$ in the horizontal direction, $y_{max}=768$ in the vertical direction and $t_{max}=7$ in the temporal direction (where $t_{max}$ is the total number of frames in the video clip). If a symbol of the video clip has the position (x,y,t) then the rank $r_x$, $r_y$, $r_t$ in each of the X, Y and T direction is given by:

$$X: r_x(s) = \left\lceil \frac{x \cdot R_x}{x_{max}} \right\rceil, Y: r_y(s) = \left\lceil \frac{y \cdot R_y}{y_{max}} \right\rceil, T: r_t(s) = \left\lceil \frac{t \cdot R_t}{t_{max}} \right\rceil$$

where $\lceil z \rceil$ denotes the ceiling of, or largest integer that is less than or equal to, z. The processor 110 determines the rank of each symbol by retrieving the appropriate position information of each symbol from the index base.

Figure 13:
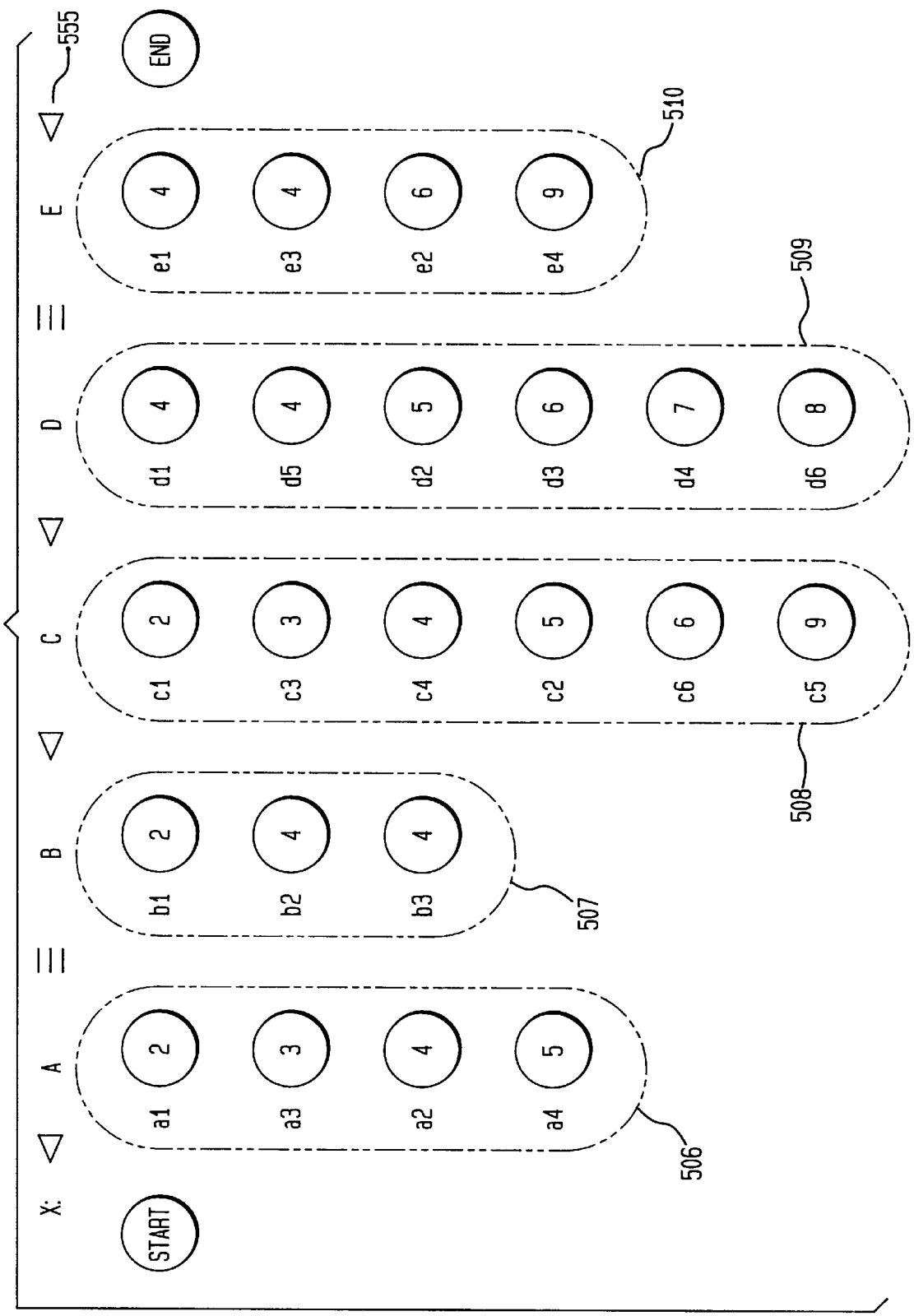

Next, the processor 110 sequentially orders (e.g., sorts) the symbols in each of the sets depending on their rank in the direction of the 1-D list (horizontal, vertical or temporal). FIG. 13 illustrates the sequential ordering of the symbols of the horizontal 1-D list 500. For example, $a_3$ has lower rank $r_x(a_3)=3$) than $a_2$ ($r_x(a_2)=4$) but a higher rank than $a_1(r_x(a_1)=2$) and is therefore ordered after $a_1$ but before $a_2$. This produces the ordered sequences 506 $\{a_1,a_3,a_2,a_4\}$, 507 $\{b_1,b_2,b_3\}$, 508 $\{c_1,c_3,c_4,c_2,c_6,c_5\}$, 509 $\{d_1,d_5,d_2,d_3,d_4,d_6\}$ and 510 $\{e_1, e_3, e_2, e_4\}$.

Next, the processor 110 segregates each sequence 506–510 of the 1-D list 500 into one or more classes of equivalently ranked symbols. The following rules are applied to determine how to segregate symbols into equivalent classes:

Case 1: If, in the extended 1-D string of the video query 555, the icon corresponding to the respective sequence is preceded by the operator "◂" or "?" and followed by the operator "◂" or "?" then all symbols in the respective sequence are in the same equivalent class Case 2: Otherwise, those symbols with equal ranks are in an equivalent class; those symbols with different ranks are in different classes.

For purposes of applying these rules, the 1-D extended string of the video query X is presumed to begin and end with the "◂" operators as follows:

X: ◂A≡B◂C◂D≡E◂

Figure 14:
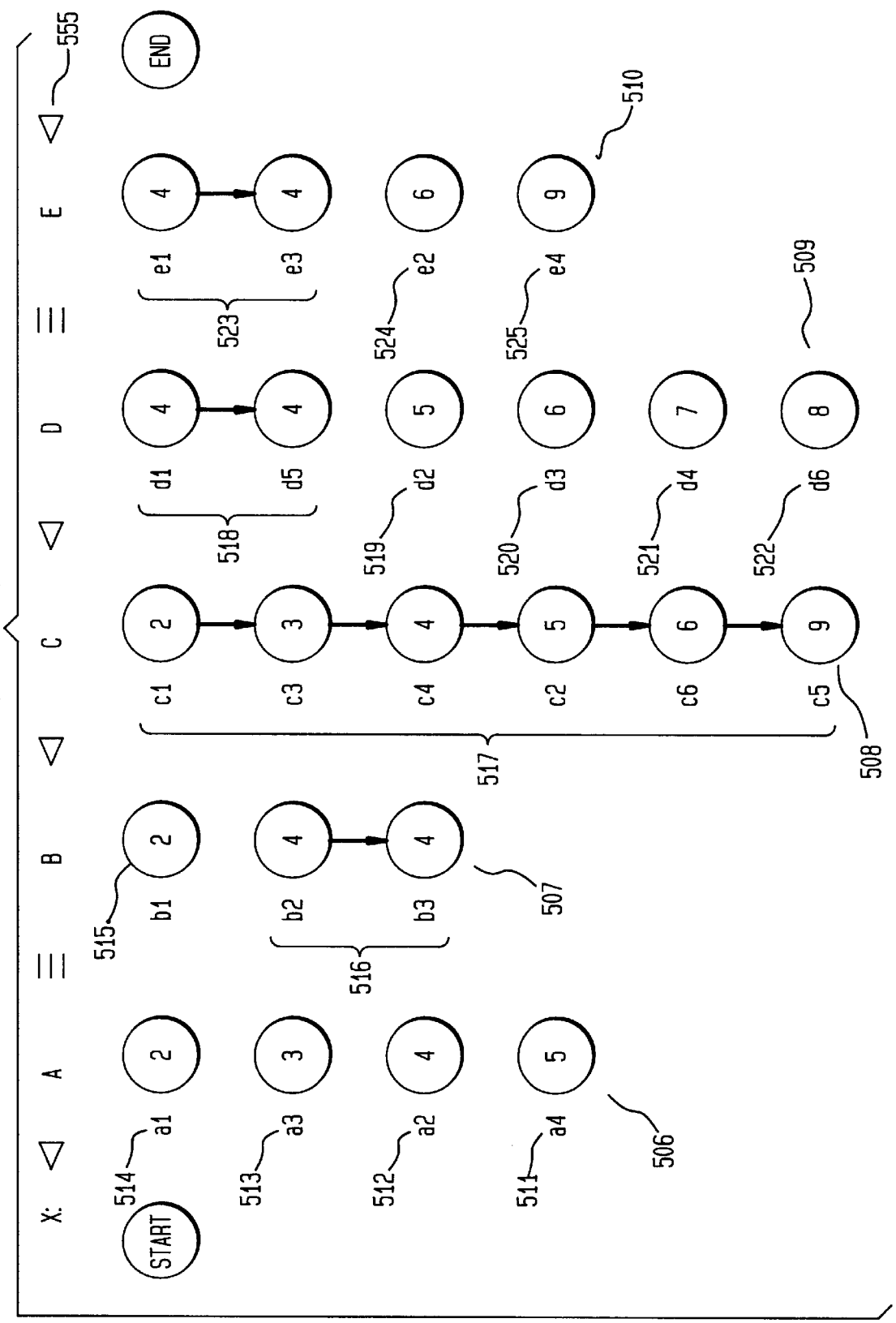

FIG. 14 illustrates the segregation of the sequences 506–510 into classes 511–525. Consider first the sequence 506 for the icon A. The icon A is preceded by the operator "◂" but followed by the operator "≡" in the extended 1-D string of the video query 555. Thus, case 1 does not apply but case 2 does. One class is formed for each different rank of the symbols in the sequence 506. Since all symbols are of different ranks, each symbol is in a different class 511, 512, 513 or 514. The class 511 is the set of $\{a_4\}$. The class 512 is the set of $\{a_2\}$. The class 513 is the set of $\{a_3\}$. The class 514 is the set of $\{a_1\}$.

Now consider the sequence 507 corresponding to the icon B. In the extended 1-D string of the video query 555, icon B is followed by the operator "◂" but preceded by the operator "≡". Therefore, case 1 does not apply but case 2 does. One class is provided for each different rank. The sequence 507 has two symbols, namely, $b_2$ and $b_3$ which have the same rank (i.e., both have rank 4). These symbols are in the same equivalent class 516, i.e., the set of $\{b_2,b_3\}$. The symbol $b_1$ is placed in a separate class 515 which is the set of $\{b_1\}$.

Now consider the sequence 508 for the icon C. The icon C is both preceded and followed by the operator "◂" in the extended 1-D string of the video query 555. Thus, case 1 applies. One equivalent rank class 517 is provided for all the symbols. The class 517 is thus the set of $\{c_1,c_3,c_4,c_2,c_6,c_5\}$. The rules are applied in this fashion to construct classes 518–525 in a like fashion. Note that each class 511–525 is a set of symbols that are sequentially ordered according to their rank. Each class 511–525 is therefore a subsequence of the symbols of the sequence 506–510. After segregating the sequences 506–510 into classes 511–525, the processor 110 links adjacent symbols in each class. The link is directed from a first symbol of the class, e.g., the symbol $c_4$ of the class 517, to the next symbol in the class according to the sequential ordering within the class, e.g., the symbol $c_2$. This is shown in FIG. 14 by arrows.

Figure 15:
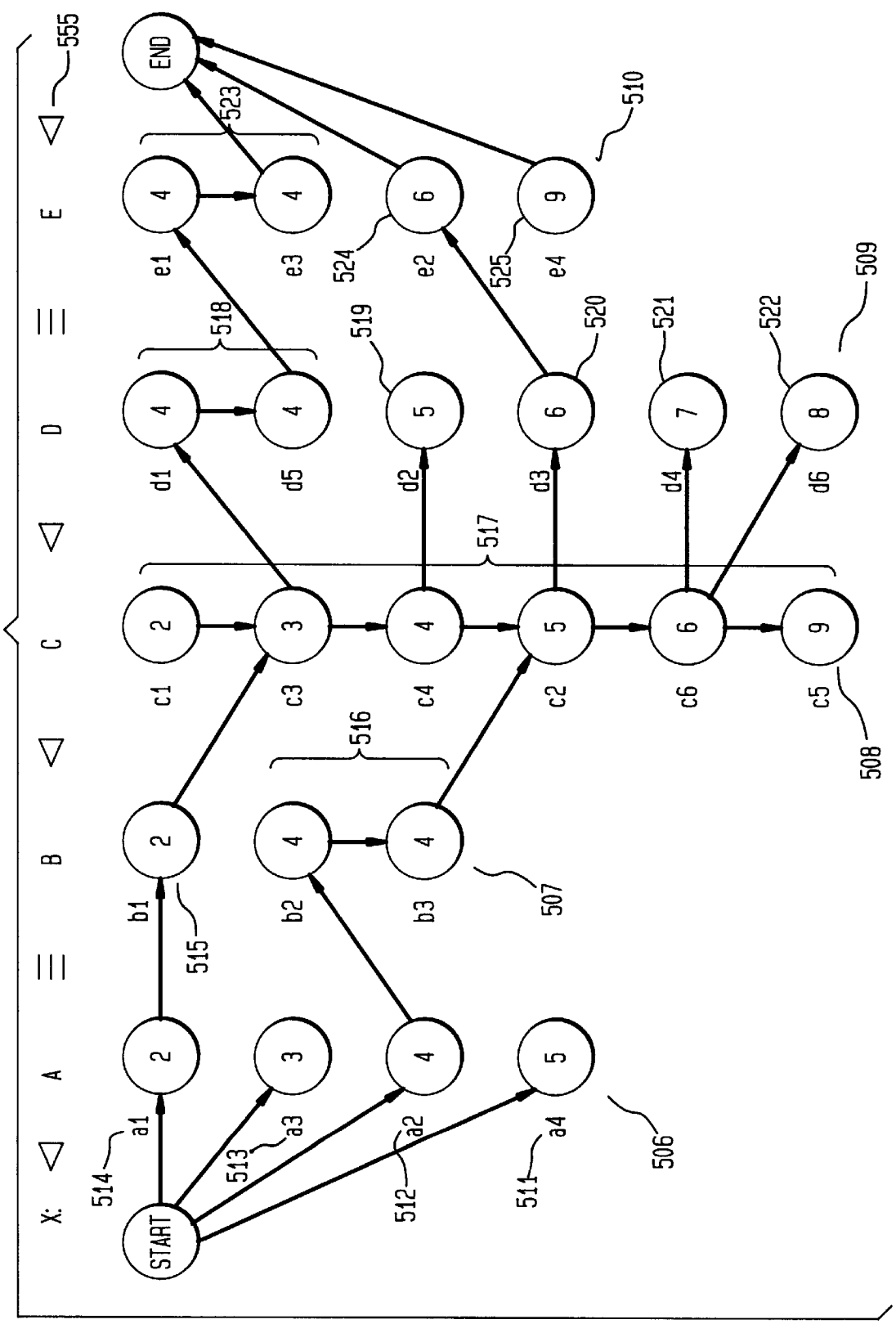

Next, the processor 110 links symbols associated with a first icon with symbols associated with a following, adjacent icon. This is illustrated in FIG. 15. Illustratively, this is achieved by applying the following linking rules for each class of symbols 511–525. In the rules below, the following notation is used:

$G_a$ is the $a^{th}$ icon in the 1-D extended string 555 of the video query, $G_b$ is the $b^{th}$ icon in the 1-D extended string 555 of the video query, where b=a+1, $G_{a,p}$ designates a $p^{th}$ class of $G_a$, $1 \leq p \leq$ last class index of $G_a$, $G_{b,k}$ designates a $k^{th}$ class of $G_b$, $1 \leq k \leq$ last class index of $G_b$, $s_i$ is any symbol in $G_{a,1}$, the first (lowest ranked) class of $G_a$, $s_{i+1}$ is the symbol which follows $s_i$ in $G_{a,1}$, $s_{imax}$ is the last symbol in the $p^{th}$ class $G_{a,p}$, $S_j$ is any symbol in $G_{b,1}$, the first (lowest ranked) class of $G_b$, $s_{j-1}$ is the symbol which precedes $s_j$ in $G_{b,1}$, $s_{jmin}$ is the first symbol in the $k^{th}$ class $G_{b,k}$, r(s) is the rank of s, $a_1$ is the operator which precedes $G_a$ in the extended 1-D string of the video query 555, $a_2$ is the operator between $G_a$ and $G_b$ in the 1-D extended string of the video query 555, and $a_3$ is the operator which follows $G_b$ in the 1-D extended string of the video query 555.

The linking rules are as follows:
(i) $s_i$ is linked with $s_j$, if:
 (1) $a_1$ is ◂ or ?,
 (2) $a_2$ is ◂,
 (3) $a_3$ is ◂ or ?,
 (4) $r(s_i) < r(s_j)$,
 (5) $r(s_{i+1}) \geq r(s_j)$, and
 (6) $r(s_i) \geq r(s_{j-1})$.
(ii) $s_i$ is linked with $s_{jmin}$ if:
 (1) $a_1$ is ◂ or ?,
 (2) $a_2$ is ◂,
 (3) $a_3$ is ≡ or $|_n$,
 (4) $r(s_i) < r(s_{jmin})$, and
 (5) $r(s_{i+1}) \geq r(s_{jmin})$.
(iii) $s_{imax}$ is linked with $s_j$ if:
 (1) $a_1$ is ≡ or $|_n$,
 (2) $a_2$ is ◂,
 (3) $a_3$ is ◂ or ?,
 (4) $r(s_{imax}) < r(s_j)$, and
 (5) $r(s_{imax}) \geq r(s_{j-1})$
(iv) $s_{imax}$ is linked with $s_{jmin}$ if:
 (1) $a_1$ is ≡ or $|_n$,
 (2) $a_2$ is ◂,
 (3) $a_3$ is ≡ or $|_n$,
 (4) $r(s_{imax}) < r(s_{jmin})$.
(v) $s_{imax}$ is linked with $s_{jmin}$ if:
 (1) $a_2$ is ≡, and (2) $r(s_{imax})=r(s_{jmin})$.
(vi) $s_{imax}$ is linked with $s_{jmin}$ if:
  (1) $a_2$ is $|_n$, and
  (2) $r(s_{jmin})-r(s_{imax})=n$.
(vii) $s_{imax}$ is linked with $s_{jmin}$ if:
  (1) $a_2$ is ?.

The link is always directed from symbol $s_i$ or $s_{imax}$ associated with $G_a$, to symbol $s_j$ or $s_{jmin}$ associated with $G_b$, wherein $G_a$ precedes $G_b$ in the extended 1-D string of the video query.

As before, for purposes of applying these rules, the 1-D string is presumed to begin and end with the operator "◄". Consider first the class 511. The icon of this $a=1^{st}$ class $G_1$ is "A". The adjacent $b=2^{nd}$ icon $G_2$, in the 1-D extended string of the video query 555 (corresponding to the symbols with which symbols of class 511 may be linked), is B. In this case, $a_1$="◄", $a_2$="=" and $a_3$="◄". Rules (i)–(iv) do not apply because conditions (i)(2), (ii)(2), (iii)(2) and (iv)(2) (wherein $a_2$=◄) are not satisfied. Rule (vi) does not apply because condition (vi)(1) $a_2$ is ? is not satisfied. Rule (vii) does not apply because condition (vi) (1) $a_2$ is ? is not satisfied. However, rule (v) may apply. According to rule (v), the last symbol in class 511 may be linked with the first symbol in one of the classes 515 or 516 if the rank of these two symbols are equal, as per condition (v)(2). The rank of the last symbol in class 511 $r_x(a_4)=5$. The rank of the first symbol in class 515 $r_x(b_1)=2$ and the rank of the first symbol in class 516 $r_x(b_2)=4$. Since condition (v)(2) cannot be satisfied, no symbol in class 511 is linked to a symbol in classes 515 or 516.

Consider now class 512. As before, only rule (v) may possibly apply (because $G_1$="A", $G_2$="B", $a_1$="◄", $a_2$="=" and $a_3$="◄"). In this case $r_x(a_2)=4$ is the same as $r_x(b_2)$. Thus, the conditions (v)(1)–(2) are satisfied. As such, symbol $a_2$ is linked with symbol $b_2$. The link is directed from the symbol $a_2$ to the symbol $b_2$ because the symbol $a_2$ is associated with the icon A which precedes the icon B, associated with the other linked symbol $b_2$, in the extended 1-D string of the video query 555.

The application of the above rules to class 513 is identical to that of class 511. The application of the rules to class 514 is identical to that of class 512. In this case, the symbol $a_1$ is linked to symbol $b_1$ because $r_x(a_1)=r_x(b_1)=2$. The symbol is directed from the symbol $a_2$ to the symbol $b_2$ because the icon A, associated with the symbol $a_2$, precedes the icon B, associated with the symbol $b_2$ in the extended 1-D list of the video query 555.

The linking of symbols in classes 515 and 516 to symbols in class 517 is now described. For both classes 515, 516, $G_2$="B" and $G_3$="C" (where a=2 and b=3), $a_1$="=", $a_2$="◄" and $a_3$="◄". Only rule (iii) can possibly apply. Consider first the case of class 515 in which the last symbol is $b_1$. Rule (iii) can apply if two conditions are true: the rank of the symbol $b_1$ is less than the rank of any given symbol in class 517, e.g., $r_x(c_3)$, but greater than or equal to the rank of the symbol which precedes the given symbol in class 517, e.g., $r_x(c_1)$. The symbol $c_3$ has a rank $r_x(c_3)=3$ which is greater than the rank $r_x(b_1)=2$. Furthermore, the symbol $c_1$ which precedes $c_3$ has a rank $r_x(c_1)=2$ which is equal to the rank of symbol $b_1$. Therefore, the processor 110 links symbols $b_1$ and $c_3$. The link is directed from $b_1$ to $c_3$ because icon B, corresponding to symbol $b_1$, precedes icon C, corresponding to symbol $c_3$, in the extended 1-D string of the video query 555. The application of the rules is very similar for class 516 in that rule (iii) applies. In this case, the last symbol $b_3$ of the class 516 is linked with the symbol $c_2$.

Consider now the application of the rules for linking the symbols of class 517 with the symbol of classes 518–522. In this case $G_3$=C, $G_4$=D (for a=3 and b=4), $a_1$="◄", $a_2$="◄" and $a_3$="=". Rule (ii) can possibly apply to the symbols of class 517. Rule (ii) can apply to any symbol in class 517 but only to the first symbol of the classes 518, 519, 520, 521 or 522. For rule (ii) to apply to a symbol in class 517, e.g., symbol $c_3$, and a first symbol of one of the classes, e.g., the symbol $d_1$ of class 518, the rank of the symbol $c_3$ must be less than the rank of the symbol $d_1$ and the rank of the symbol in class 517 following $c_3$, namely, symbol $c_4$, must be greater than or equal to the rank of the symbol $d_1$. Since this is true, the symbol $c_3$ is linked to the symbol $d_1$. Note that $r_x(c_1)<r_x(d_1)$. However, $r_x(c_3)$ (the symbol which follows $c_1$) is not greater than or equal to $r_x(d_1)$. Therefore, symbol $c_1$ is not linked to $d_1$. Note also that rule (ii) is satisfied for linking symbol $c_6$ to symbol $d_4$ and to symbol $d_6$. Finally, note that symbol $c_5$ cannot satisfy rule (ii). Rule (v) may then be applied for linking the symbols in classes 518–522 with the symbols in classes 523–525.

Figure 16:
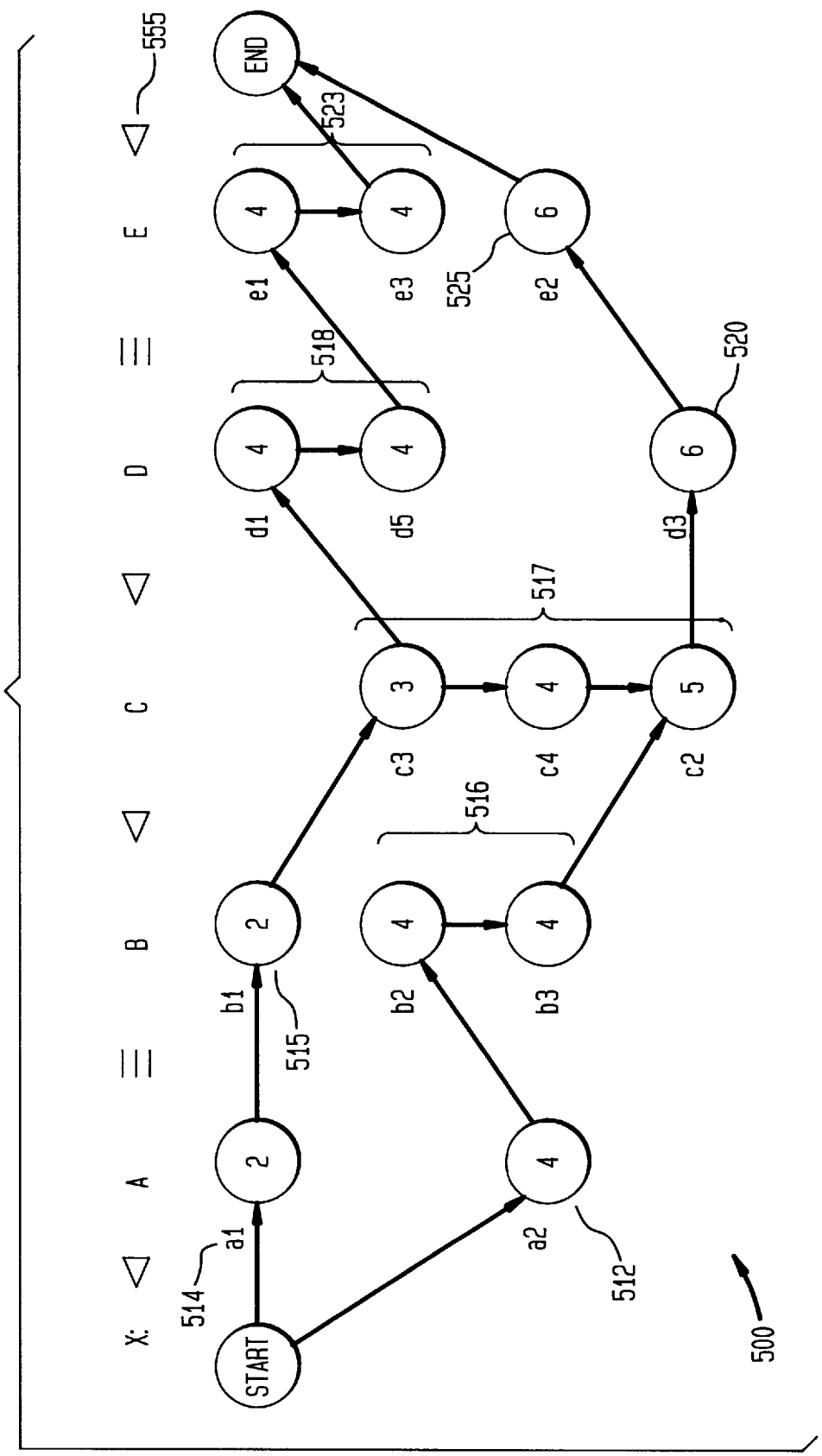

After linking the symbols in the classes 511–525, the processor 110 then discards certain symbols from the 1-D list of the video clip 500. In particular, the processor 110 discards all symbols not on a continuously directed link from a symbol in the sequence 506 associated with the first icon A to a symbol in the sequence 510 associated with the last icon E, of the 1-D extended string of the video query 555. This is illustrated in comparing FIGS. 15 and 16. An example of a continuously directed link is:

$$a_1 \to b_1 \to c_3 \to c_4 \to c_2 \to d_3 \to e_2$$

Note that symbols $a_3$, $a_4$, $c_1$, $c_5$, $c_6$, $d_2$, $d_4$, $d_6$ and $e_4$ are not on a continuously directed link. Symbols $c_1$ and $e_4$ cannot be reached by traversing the links of the 1-D list of the video clip 500 (in the direction indicated by the links) from a symbol associated with the first icon A of the 1-D extended string of the video query. On the other hand, it is not possible to traverse links in the 1-D list of the video clip 500 from the symbols $a_3$, $a_4$, $c_5$, $c_6$, $d_2$, $d_4$ and $d_6$ to a symbol associated with the last icon E, of the 1-D extended string of the video query 555.

After producing the extended 1-D list 500, the processor 110 executes step 330. In step 330, the processor 110 determines which subsequence of frames of the video clip satisfy the video query. This is achieved by forming each possible permutation of symbols from each 1-D list of the video clip (i.e., from the 1-D list in the horizontal direction, the 1-D list in the vertical direction and the 1-D list in the temporal direction). One set of permutations (wherein each permutation is a set, itself) is formed for each of the 1-D lists of the video clip. This is illustrated in connection with FIG. 16 for the 1-D list of the video clip 500 in the horizontal (X) direction. Each permutation of symbols includes one symbol corresponding to each icon of the extended 1-D string of the video query 555. However, the selection of symbols is governed by the following rules:

(1) The first symbol of the permutation (corresponding to the first icon A of the extended 1-D string of the video clip 555) may be selected from any one of the classes 512, 514 in the extended 1-D list of the video clip 500.

(2) Each permutation symbol other than the first permutation symbol is selected by the following rule. The next symbol of the permutation, in the next class (associated with the next icon in the extended 1-D string of the video query 555) must be on a continuously linked path of the extended 1-D list of the video clip 500 extending from the current selected symbol (in a current class associated with the current icon in the extended 1-D string of the video query). The following are possibilities for selecting the next symbol:
(a) The current symbol is directly linked to the next symbol. For example, if the current symbol is $a_1$, the next symbol can be $b_1$ which is directly linked to the symbol $a_1$.
(b) A symbol which follows the current symbol in the current class is directly linked to the next symbol. For example, if the current symbol is $b_2$, the next symbol can be $c_2$ which is directly linked to the symbol $b_3$ which follows the current symbol $b_2$ in the current class 516.
(c) The current symbol is directly linked to a symbol of the next class which precedes the next symbol in the next class. For example, if the current symbol is $b_1$, the next can be $c_2$. Symbol $c_2$ is in the same next class 517 as, and is preceded in the next class by, the symbol $c_3$ which is directly linked to the symbol $b_1$.
(d) A symbol which follows the current symbol in the current class is directly linked to a symbol of the next class which precedes the next symbol in the next class. For example, if the current symbol is $d_1$, the next symbol can be $e_3$. Symbol $e_3$ is preceded in the same next class 523 by the symbol $e_1$. Symbol $e_1$ is directly linked to the symbol $d_5$. The symbol $d_5$ follows the symbol $d_5$ in the same current class 518.

According to these rules, the following set $S_X$ of permutations can be formed for the horizontal (X) direction:

$$S_X=\{\{a_1,b_1,c_3,d_1,e_3\},\{a_1,b_1,c_3,d_1,e_1\},\{a_1,b_1,c_3,d_5,e_3\},\{a_1,b_1,c_3,d_5,e_1\},\{a_1,b_1,c_3,d_3,e_2\},\{a_1,b_1,c_4,d_3,e_2\},\{a_1,b_1,c_2,d_3,e_2\},\{a_2,b_2,c_2,d_3,e_2\},\{a_2,b_3,c_2,d_3,e_2\}\}.$$

Figure 17:
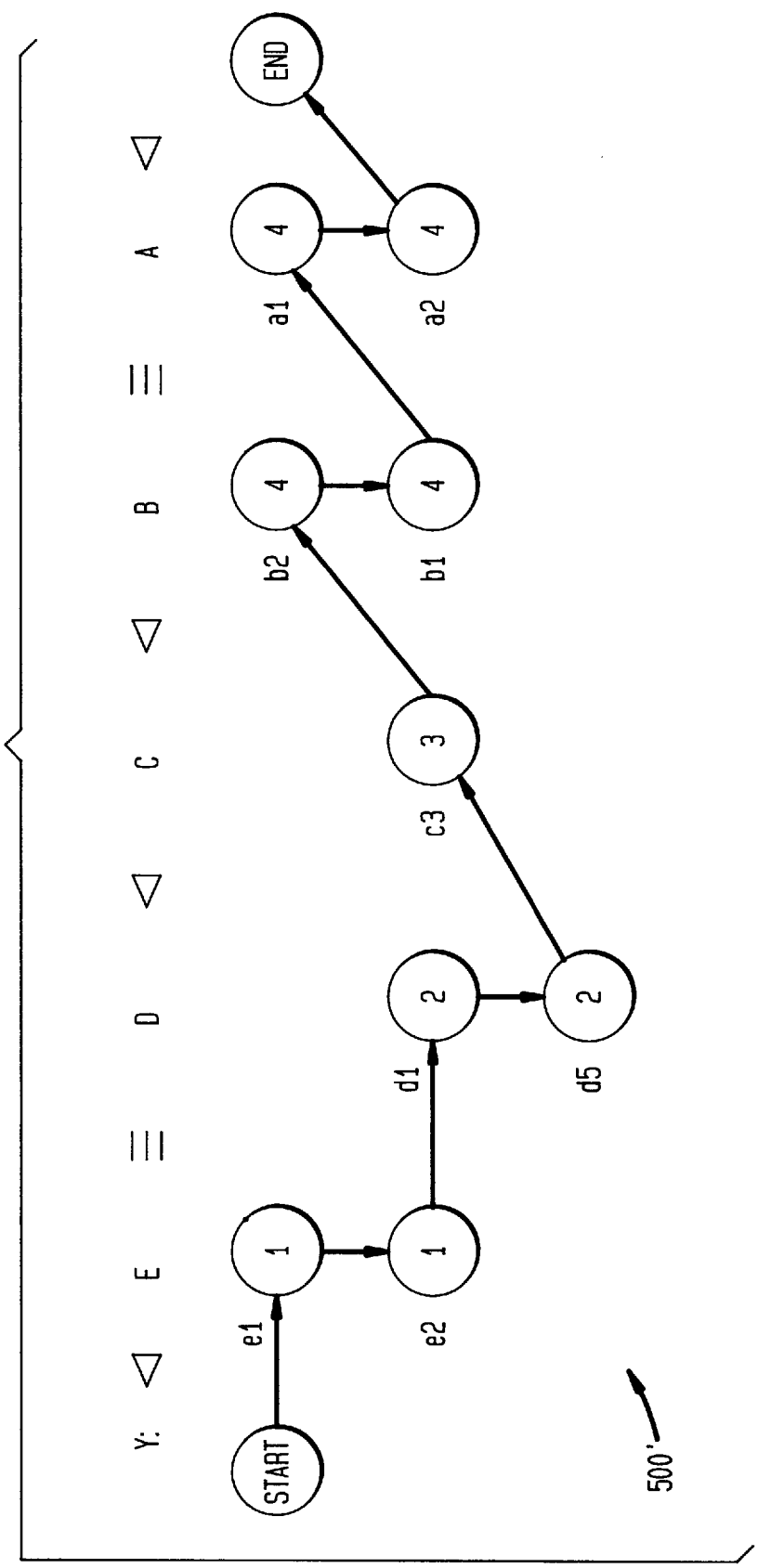
FIGS. 17 and 18 illustrate 1-D lists in the vertical and temporal directions, respectively, of a video clip according to an embodiment of the present invention.
Figure 18:
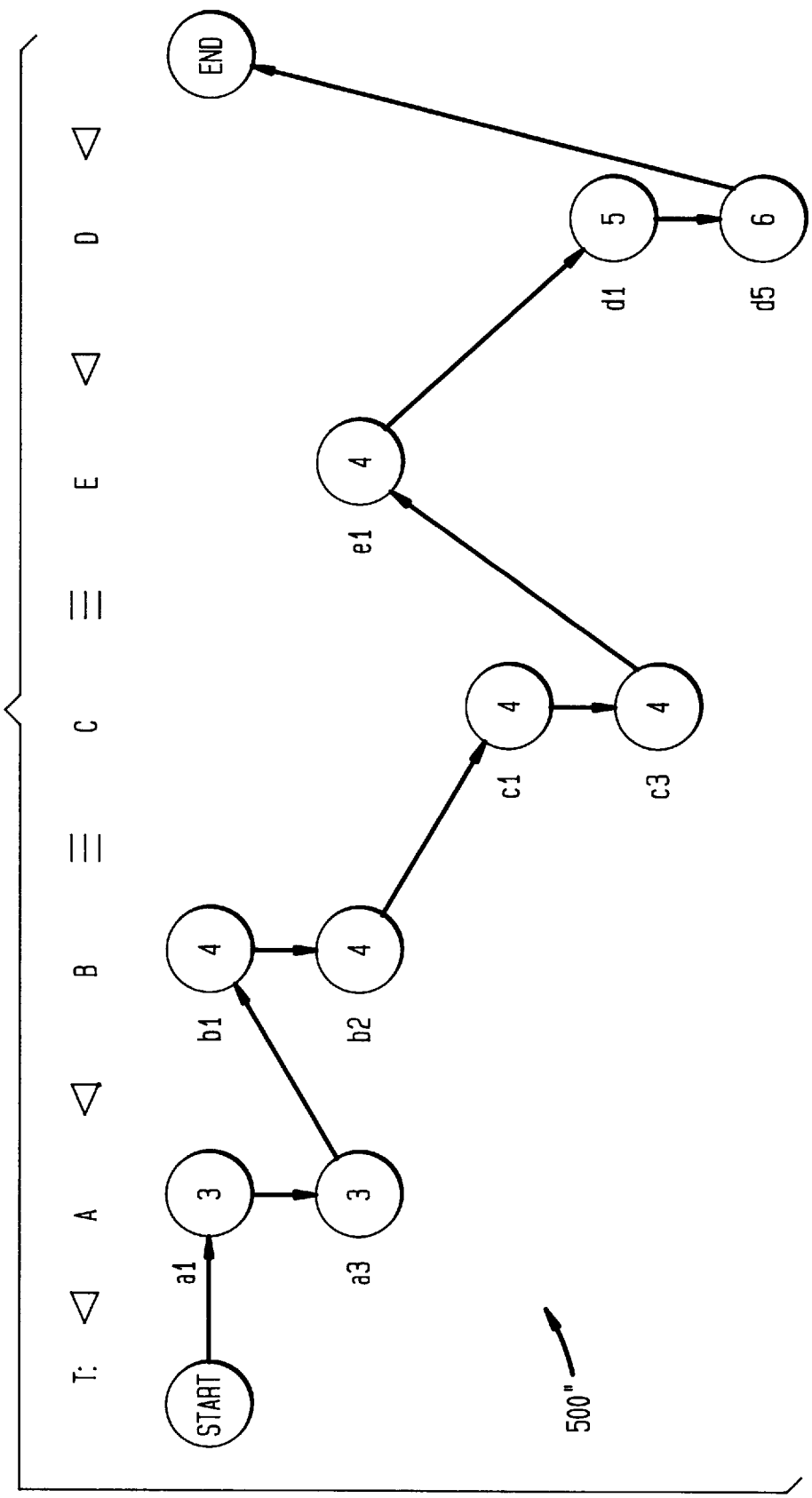

FIGS. 17 and 18 show extended 1-D lists 500', 500" of the video clip formed for the vertical (Y) and temporal (T) directions. Sets of permutations $S_Y$ and $S_T$ are formed for these list as well as follows:

$$S_Y = \{\{e_1, d_1, c_3, b_2, a_1\}, \{e_1, d_1, c_3, b_2, a_2\}, \{e_1, d_1, c_3, b_1, a_1\},$$
$$\{e_1, d_1, c_3, b_1, a_2\}, \{e_1, d_5, c_3, b_2, a_1\}, \{e_1, d_5, c_3, b_2, a_2\},$$
$$\{e_1, d_5, c_3, b_1, a_1\}, \{e_1, d_5, c_3, b_1, a_2\}, \{e_2, d_1, c_3, b_2, a_1\},$$
$$\{e_2, d_1, c_3, b_2, a_2\}, \{e_2, d_1, c_3, b_1, a_1\}, \{e_2, d_1, c_3, b_1, a_2\},$$
$$\{e_2, d_5, c_3, b_2, a_1\}, \{e_2, d_5, c_3, b_2, a_2\}, \{e_2, d_5, c_3, b_1, a_1\},$$
$$\{e_2, d_5, c_3, b_1, a_2\}\}$$

$$S_T = \{\{a_1, b_1, c_1, e_1, d_1\}, \{a_1, b_1, c_1, e_1, d_5\}, \{a_1, b_1, c_3, e_1, d_1\},$$
$$\{a_1, b_1, c_3, e_1, d_5\}, \{a_1, b_2, c_1, e_1, d_1\}, \{a_1, b_2, c_1, e_1, d_5\},$$
$$\{a_1, b_2, c_3, e_1, d_1\}, \{a_1, b_2, c_3, e_1, d_5\}, \{a_3, b_1, c_1, e_1, d_1\},$$
$$\{a_3, b_1, c_1, e_1, d_5\}, \{a_3, b_1, c_3, e_1, d_1\}, \{a_3, b_1, c_3, e_1, d_5\},$$
$$\{a_3, b_2, c_1, e_1, d_1\}, \{a_3, b_2, c_1, e_1, d_5\}, \{a_3, b_2, c_3, e_1, d_1\},$$
$$\{a_3, b_2, c_3, e_1, d_5\}\}$$

Given the sets of permutations for each of the extended 1-D lists 500, 500', 500" of the video clip, it is only necessary to intersect them to determine which frames of the video clip satisfy the video query. Thus the intersection is:

$$S=S_X \cap S_Y \cap S_T=\{\{a_1,b_1,c_3,d_1,e_1\},\{a_1,b_1,c_3,d_5,e_1\}\}$$

The intersection set can then be used to identify the matching video as follows. Each permutation of the intersection set refers to a unique match in the video clip. The processor 110 accesses the index base stored in memory 120 or 130 and retrieves the exact position of each symbol in each permutation. The processor 110 can then retrieve the video frames of the clips which contain the symbols in a respective permutation set of the intersection. (Note that the frame numbers are indicated by the positions of the symbols of the permutations recorded in the index base). The frames corresponding to one of these permutations may then be displayed on the display device 150, for example, in real time or otherwise via the graphical user interface shown in FIGS. 9 and 10. Since the exact position is known for each icon that satisfies the video query, these icons may optionally be displayed in highlighted form in the retrieved frames. The user may then perform further processing on the retrieved frames such as, displaying the frames, compressing the frames, filtering the frames, etc.

Thus, the invention avoids the necessity of performing a frame-by-frame search of each video clip which, depending on the matching criterion, can have a very high processing time. Note also that it is not necessary to directly compare strings representing the video query to strings representing each frame of each video clip. Rather, 3-D lists are constructed for each video clip utilizing a lower processing overhead, and the intersection of each of the lists need only be formed.

Note that the inventive indexing and query process and system may be used in a video file server, for example in a video on demand system. The invention may also be employed in an electronic library or in conjunction with remote video education systems.

In short, a video indexing and query execution method and system are provided.

The method may be performed by a processor which performs the following steps to index the video clips:
(a) identifying each symbol of one or more graphical icons in each frame of each video clip,
(b) determining the horizontal, vertical and temporal coordinates of each symbol of the one or more identified graphical icons, and
(c) constructing an index base for each identified symbol of the one or more graphical icons which includes its coordinates.

In converting a video query from graphical form to string form, the processor may execute the following steps:
(a) receiving a video query specifying the vertical, horizontal and temporal coordinates of at least one graphical icon in at least one frame, and
(b) constructing a 3-D string from the video query indicating the distance between each symbol of each icon in the video query in the vertical, horizontal and temporal directions.

In executing a video query on a database containing at least one video clip, the processor may perform the following steps:
(a) identifying only those video clips of the database whose signatures contain the signature of the executed video query,
(b) for each of the identified video clips:
(b1) constructing a 1-D list for each of the horizontal, vertical and temporal directions, comprising a plurality of sets of symbols of icons contained in video query, each set containing a permutation of symbols of the icons which satisfy the video query in the respective direction of the 1-D list,
(b2) forming the intersection of the three 1-D lists, and
(c) identifying the portions of the video clips, indicated by a corresponding set contained in an intersection set of at least one of the identified sequences, as satisfying the video query.

Finally, the above discussion is intended to be merely illustrative. Those having ordinary skill in the art may devise numerous alternative embodiments without departing from the spirit and scope of the following claims.

The claimed invention is:
1. A method for executing queries to locate one or more frames of one or more video clips in a video database comprising the steps of:

(a) identifying each symbol of one or more graphical icons in each frame of each video clip, (b) determining the horizontal, vertical and temporal coordinates of each symbol of said one or more identified graphical icons, (c) constructing an index base for each identified symbol of said one or more graphical icons which includes said coordinates, (d) receiving a video query indicating at least one frame of a video clip to be retrieved, said video query specifying the vertical, horizontal and temporal coordinates of at least one graphical icon to be matched to said at least one frame to be retrieved, (e) constructing a 3-D string from said video query, which 3-D string indicates the distance between each symbol of each icon in said video query in said vertical, horizontal and temporal directions, (f) identifying only those video clips of said database whose signatures contain the signature of said executed video query, (g) for each of said identified video clips:
 (g1) constructing a 1-D list for said horizontal direction, a 1-D list for said vertical direction and a 1-D list for said temporal direction, wherein each of said 1-D lists comprises a plurality of sets of symbols of icons, which icons are contained in said signature of said executed video query, and wherein each of said sets contains a permutation of symbols of said icons which satisfy said video query in said respective direction of said 1-D list,
 (g2) forming the intersection of said 1-D list for said horizontal direction, said 1-D list for said vertical direction and said 1-D list for said temporal direction, and (h) identifying the portions of at least one of said identified video clips, indicated by a corresponding set contained in an intersection set of at least one of said identified video clips, as satisfying said video query.

2. The method of claim 1 wherein step (a) further comprises, for each clip, only identifying each symbol of said one graphical icon in an earliest presented frame in which said symbol occurs.

3. The method of claim 1 further comprising the step of:
constructing a video signature of said video clip which contains the set of each graphical icon that occurs at least once in said video clip.

4. The method of claim 1 further comprising the step of:
depending on matching criterion of said video query, converting a normal 3-D string of said video query to an extended 3-D string which indicates:
 (1) an undefined distance,
 (2) an order of precedence, of unspecified distance,
 (3) an equal distance, or
 (4) a specific distance
between each pair of said icons of said video query in said horizontal, vertical and temporal directions of frames of said video clips.

5. The method of claim 4 further comprising the step of:
constructing a video signature of said video query which contains the set of each graphical icon that occurs at least once in said video query.

6. The method of claim 5 wherein step (g1) further comprises, for each of said horizontal, vertical and temporal directions, the steps of:
 (i) forming a plurality of sets of symbols, including one set for each icon of said video query signature, each set containing each symbol, contained in said video clip, of said icon to which said set corresponds,
 (ii) determining the rank of each symbol of each of said sets formed in step (i), wherein rank is an order of precedence, in said respective direction of said 1-D list, of said icons,
 (iii) ordering the symbols of each set formed in step (i) in order of increasing rank, so as to form one sequence of symbols for each icon,
 (iv) selectively segregating the symbols of each icon into equivalently ranked classes and linking each pair of icons in each class, each link being directed from a first symbol of a class to the very next symbol of equal or higher rank, of said same class, and
 (v) using operators of a 1-D extended string of said extended 3-D string of said video query, which 1-D extended string corresponds to the same direction as said 1-D list, selectively linking said symbols, wherein each link of step (v) is directed from a symbol of one icon to a symbol of another icon which immediately succeeds said one icon in said extended 1-D string of said video query.

7. The method of claim 6 further comprising the step of:
discarding each symbol of said classes of said video sequence not continuously linked between a symbol of the first icon, and a symbol of the last icon, of said extended 1-D string of said video query.

8. The method of claim 6 further comprising the steps of:
using said linked classes of symbols of said icons of said video clip, forming each possible permutation of symbols, which permutations each include one symbol of each icon contained in said video query signature, by:
 selecting a first symbol in a class associated with the first icon of said extended 1-D string of said video query,
 selecting each subsequent symbol by traversing said links, in said direction of said links, from the last selected symbol to a symbol in another class associated with the icon which follows the icon, with which said last selected symbol is associated, in said extended 1-D string of said video query.

9. The method of claim 6 wherein said step (iv) further comprises the steps of:
determining that all symbols of a sequence have an equivalent rank if said 1-D extended string of said video query indicates that the icon of said symbol sequence:
 (1) precedes the next icon, by an unspecified distance, and is preceded by the previous icon, by an unspecified distance,
 (2) is an undefined distance from both the previous and next icon,
 (3) precedes the next icon, by an unspecified distance, and is an undefined distance from the previous icon, or
 (4) is an undefined distance from the next icon and is preceded by the previous icon, by an unspecified distance, and otherwise determining that only those symbols of a given icon having equal ranks are equivalent.

10. The method of claim 6, wherein icons $G_a$ and $G_b$ are contained in said video clip, wherein $G_a$ immediately precedes, and is adjacent to, $G_b$ in said extended 1-D string of said video query, where:

$G_{a,p}$ designates a $p^{th}$ subsequence of $G_a$, $1 \leq p \leq$ last subsequence ordinate of $G_a$, $G_{b,k}$ designates a $k^{th}$ subsequence of $G_b$, $1 \leq k \leq$ last subsequence ordinate of $G_b$, $G_{a,1}$ is the first, lowest ranked class of $G_a$ $s_i$ is any symbol in $G_{a,1}$, $s_{i+1}$ is the symbol of equal or higher rank which immediately follows $s_i$, $s_{imax}$ is the last symbol in the $p^{th}$ subsequence $G_{a,p}$, $G_{b,1}$ is the first, lowest ranked class of $G_b$, $s_j$ is any symbol in $G_{b,1}$, the first, lowest ranked class of $G_b$, $s_{j-1}$ is the symbol of equal or lower rank which immediately precedes $s_j$, $s_{jmin}$ is the first symbol in the $k^{th}$ subsequence $G_{b,k}$, $r(s)$ is the rank of s, ◁, $|_n$, ≡ and ? are operators in said 3-D extended string of said video query ◁ indicates precedes, by an unspecified distance, $|_n$ indicates precedes by a distance of n, ≡ indicates equal distance, ? indicates undefined, $a_1$ is the indicator which precedes $G_a$ in said extended 3-D string, $a_2$ is the indicator between $G_a$ and $G_b$ in said 3-D extended string, and $a_3$ is the indicator which follows $G_b$ in said 3-D extended string, said step (v) further comprising the steps of:

(i) linking $s_i$ with $s_j$, if:
  (1) $a_1$ is ◁ or ?,
  (2) $a_2$ is ◁,
  (3) $a_3$ is ◁ or ?,
  (4) $r(s_i)<r(s_j)$,
  (5) $r(s_{i+1}) \geq r(s_j)$, and
  (6) $r(s_i) \geq r(s_{j-1})$.

(ii) linking $s_i$ with $s_{jmin}$ if:
  (1) $a_1$ is ◁ or ?,
  (2) $a_2$ is ◁,
  (3) $a_3$ is ≡ or $|_n$,
  (4) $r(s_i)<r(s_{jmin})$, and
  (5) $r(s_{i+1}) \geq r(s_{jmin})$.

(iii) linking $s_{imax}$ with $s_j$ if:
  (1) $a_1$ is ≡ or $|_n$,
  (2) $a_2$ is ◁,
  (3) $a_3$ is ◁ or ?,
  (4) $r(s_{imax})<r(s_j)$, and
  (5) $r(s_{imax}) \geq r(s_{j-1})$ (iv) linking $s_{imax}$ with $s_{jmin}$ if:
  (1) $a_1$ is ≡ or $|_n$,
  (2) $a_2$ is ◁,
  (3) $a_3$ is ≡ or $|_n$,
  (4) $r(s_{imax})<r(s_{jmin})$.

(v) linking $s_{imax}$ with $s_{jmin}$ if:
  (1) $a_2$ is ≡, and
  (2) $r(s_{imax})=r(s_{jmin})$ (vi) linking $s_{imax}$ with $s_{jmin}$ if:
  (1) $a_2$ is $|_n$, and
  (2) $r(s_{jmin})-r(s_{imax})=n$, and (vii) linking $s_{imax}$ with $s_{jmin}$ if:
  (1) $a_2$ is ?.

11. A method for indexing a video clip comprising: (a)

(a) identifying each symbol of one or more graphical icons in each frame of said video clip, (b) determining the horizontal, vertical and temporal coordinates of each symbol of said one or more identified graphical icons, and (c) constructing an index base for each identified symbol of said one or more graphical icons which includes said coordinates, horizontal, vertical and temporal, said index base being searchable using a 3-D string constructed from a video query, which 3-D search string indicates the distance between each symbol in each icon in said video query in said vertical, horizontal and temporal directions.

12. A method for executing a video query on a database containing at least one video clip comprising the steps of:

(a) identifying only those video clips of said database whose signatures contain the signature of said executed video query, (b) for each of said identified sequences of video frames:
  (b1) constructing a 1-D list for said horizontal direction, a 1-D list for said vertical direction and a 1-D list for said temporal direction, wherein each of said 1-D lists comprises a plurality of sets of symbols of icons, which icons are contained in said signature of said executed video query, and wherein each of said sets contains a permutation of symbols of said icons which satisfy said video query in said respective direction of said 1-D list, (c) forming the intersection of said 1-D list for said horizontal direction, said 1-D list for said vertical direction and said 1-D list for said temporal direction, and (d) identifying the portions of at least one of said identified video clips, indicated by a corresponding intersection set contained in at least one of said identified video clips, as satisfying said video query.

13. A system for indexing a video clip comprising:

a processor for identifying each symbol of one or more graphical icons in each frame of said video clip, determining the horizontal, vertical and temporal coordinates of each symbol of said one or more identified graphical icons, and constructing an index base for each identified symbol of said one or more graphical icons which includes said horizontal, vertical and temporal coordinates, said index base being searchable using a 3-D string constructed from a video query, which 3-D search string indicates the distance between each symbol in each icon in said video query in said vertical, horizontal and temporal directions.

14. A system for executing a video query on a database containing at least one video clip comprising:

a processor for identifying only those video clips of said database whose signatures contain the signature of said executed video query, for each of said identified sequences of video frames, constructing a 1-D list for said horizontal direction, a 1-D list for said vertical direction and a 1-D list for said temporal direction, wherein each of said 1-D list comprises a plurality of sets of symbols of icons, which icons are contained in said signature of said executed video query, and wherein each of said sets contains a permutation of symbols of said icons which satisfy said video query in said respective direction of said 1-D list, and forming the intersection of said 1-D list for said horizontal direction, said 1-D list for said vertical direction and said 1-D list for said temporal direction, and identifying the portions of at least one of said identified video clips, indicated by a corresponding intersection set at least one of said identified video clips, as satisfying said video query.

* * * * *